(12) United States Patent
Ciancio et al.

(10) Patent No.: US 8,123,125 B2
(45) Date of Patent: Feb. 28, 2012

(54) COMBINED IN-STORE AND FUEL CENTER POINT-OF-SALE SYSTEM

(75) Inventors: David Ciancio, Hamilton, OH (US); David Stevenson, Littleton, CO (US)

(73) Assignee: The Kroger Co., Cincinnati, OH (US)

( * ) Notice: Subject to any disclaimer, the term of this patent is extended or adjusted under 35 U.S.C. 154(b) by 24 days.

(21) Appl. No.: 12/342,385

(22) Filed: Dec. 23, 2008

(65) Prior Publication Data
US 2009/0150244 A1    Jun. 11, 2009

Related U.S. Application Data

(63) Continuation of application No. 11/263,080, filed on Oct. 31, 2005, now Pat. No. 7,469,826.

(51) Int. Cl.
*G06K 5/00*    (2006.01)
(52) U.S. Cl. .................. 235/380; 235/375; 235/383
(58) Field of Classification Search .............. 235/380, 235/383; 705/14
See application file for complete search history.

(56) References Cited

U.S. PATENT DOCUMENTS

| | | | |
|---|---|---|---|
| 4,395,627 A | 7/1983 | Barker et al. |
| 4,589,069 A | 5/1986 | Endo et al. |
| 5,586,686 A | 12/1996 | Bustos et al. |
| 5,832,457 A | 11/1998 | O'Brien et al. |
| 5,889,676 A | 3/1999 | Kubo et al. |
| 5,923,016 A | 7/1999 | Fredregill et al. |
| 5,926,097 A | 7/1999 | Kobayashi et al. |
| 6,092,629 A | 7/2000 | Bohnert et al. |
| 6,112,981 A | 9/2000 | McCall |
| 6,128,551 A | 10/2000 | Davis et al. |
| 6,321,984 B1 | 11/2001 | McCall et al. |
| 6,332,128 B1 | 12/2001 | Nicholson |

(Continued)

FOREIGN PATENT DOCUMENTS

CA    1 234 632    3/1988

(Continued)

OTHER PUBLICATIONS

Hisey, "Storming the Store Card Gates", Credit Card Management, vol. 10, No. 4, ABI/INFORM Global, Jul. 1997, pp. 82-85.

(Continued)

*Primary Examiner* — Michael G Lee
*Assistant Examiner* — Kristy A Haupt
(74) *Attorney, Agent, or Firm* — Pillsbury Winthrop Shaw Pittman LLP

(57) ABSTRACT

A combined in-store and fuel center point-of-sale system having a first point-of-sale system, having a checkout manager and one or more checkout terminals, and a second point-of-sale system, having a fuel center and one or more fuel pumps, in communication with each other and with one or more primary databases containing marketing data, consumer data, customer data, master sales data, discount data, and merchandise product data, for generating a fuel discount at the second point-of-sale system based on first purchasing activity at the first point-of-sale system and/or second purchasing activity at said second point-of-sale system. The fuel discount is maintained for each customer in one of said primary databases and is based on a total purchase of products, a total purchase of product units, a total purchase amount of a product type, time period for total purchase of products, or a tiered spending amount.

6 Claims, 13 Drawing Sheets

U.S. PATENT DOCUMENTS

| | | | |
|---|---|---|---|
| 6,484,146 | B2 | 11/2002 | Day et al. |
| 6,732,081 | B2 | 5/2004 | Nicholson |
| 6,741,968 | B2 * | 5/2004 | Jacoves et al. ............. 705/14.23 |
| 6,778,967 | B1 | 8/2004 | Nicholson |
| 6,801,835 | B2 | 10/2004 | Covington et al. |
| 6,813,609 | B2 | 11/2004 | Wilson |
| 6,885,996 | B2 | 4/2005 | Nicholson |
| 2001/0001203 | A1 * | 5/2001 | McCall et al. ................ 235/375 |
| 2001/0018664 | A1 * | 8/2001 | Jacoves et al. .................. 705/14 |
| 2001/0049626 | A1 * | 12/2001 | Nicholson ....................... 705/14 |
| 2002/0046117 | A1 | 4/2002 | Marion |
| 2003/0033154 | A1 | 2/2003 | Hajdukiewicz et al. |
| 2005/0234776 | A1 * | 10/2005 | Jacoves et al. .................. 705/14 |
| 2006/0095318 | A1 * | 5/2006 | Ross et al. ....................... 705/14 |

FOREIGN PATENT DOCUMENTS

| | | |
|---|---|---|
| EP | 0 511 463 A2 | 11/1992 |
| GB | 2 274 349 A | 7/1994 |
| JP | 2-217998 | 8/1990 |
| WO | WO 91/18373 | 11/1991 |

OTHER PUBLICATIONS

Shockey, "Automated Pumps New Krown Jewel; Lawton Grocery Unveils Unattended Gas Station", The Sunday Oklahoman, Feb. 26, 1989, pp. 1-C & 2-C (1 page).

Braykovich, "Want gas? Biggs sells that too", The Cincinnati Enquirer, Oct. 4, 1989, pp. B-9 & B-14 (1 page).

*Grocery Fuel System Installation Manual*, Convenient Fuel Group, version .01, Aug. 1, 1998, 20 pages.

*Gilbarco and Convenient Fuel Group Form Strategic Alliance: Companies Partnering to Bring Automated Petroleum Dispensing to Hypermarkets*, Gilbarco Press Release, Spring 1999, 10 pages.

*Convenient Fuels Group System Operation Manual*, Convenient Fuel Group, version .01, May 10, 1998, 18 pages.

Disclosure Document Receipt Notice and Disclosure Document for U.S. Disclosure Document No. 434189, dated Apr. 7, 1998, 6 pages Krone, et al., "Apparatus for Control and Reporting of Motor Fuel Sales", Utility Patent Application, Aug. 5, 1998, 14 pages.

Kidd, "Giant retailer hopes to buy 300 gas bars", The Toronto Star, Toronto Star Newspapers, Ltd., Feb. 17, 1989, p. C3 (3 pages).

Morton,."ASDA Hots Up Petrol War With Voucher Bonus", Evening Standard (London), Associated Newspapers Ltd., Feb. 24, 1995, p. 3 (1 page).

Simms, "Report on Data Base Marketing: Retailers pin hope on marketing skill; Loyalty Programs / Zellers, Canadian Tire set standard for looming battle with Wal-Mart", The Globe and Mail (Canada), Bell Globemedia Publishing Inc. and its licensors, Feb. 15, 1994, pp. 1-3.

Pandya, "Sainsbury in card counter-attack", The Guardian (London), Guardian Newspapers Limited, Nov. 4, 1995, p. 31 (2 pages).

"Sainsbury's cuts the cost of motoring", no author available, PR Newswire Europe, Origin Universal News Services Limited, Jan. 11, 1995, p. 1.

Wylie, "Tesco Loyalty Move Fuels Petrol Price War; The forecourts battle has been stepped up by a supermarket. Ian Wylie explains how", The Guardian (London), Guardian Newspapers Limited, Mar. 16, 1996, p. 3 (2 pages).

Allossery, "Can Tire launches loyalty program", Strategy, Brunico Communications, Inc., Mar. 7, 1994, p. 2 (1 page).

Summerfield, "Canadian Tire", Strategy, Brunico Communications, Inc., Mar. 8, 1993, pp. CT1-CT5 & CT7 (10 pages).

*Canadian Tire Corporation Limited 1992 Annual Report*, Canadian Tire Corporation Limited, 1992, 21 pages.

Affidavit of Don Krone, executed on Apr. 27, 2006, United States Patent and Trademark Office, Office of Initial Patent Examination, date-stamped Mar. 9, 2009.

'Financial Marketing Consultants, Inc., "Krown Systems presents the unattended electronic fueling station for the grocery and mass merchandising industries", Krown Systems, 4 pages, Dec. 23, 2008.

*Fleming/CFG Petroleum Marketing Plan (Draft)*, Fleming: A Marketing and Distribution Company, Jul 2, 1997, 20 pages.

\* cited by examiner

COMBINED IN-STORE AND FUEL CENTER POINT-OF-SALE SYSTEM

CROSS-REFERENCES

This application is a continuation of application Ser. No. 11/263,080 filed Oct. 31, 2005, the entirety of which is incorporated herein by reference.

BACKGROUND OF THE INVENTION

1. Field of the Invention

The present invention relates in general to a system and method for the discount pricing of merchandise and fuel, and in particular, to a system and method having an in-store point-of-sale system communicate with a fuel center point-of-sale system to create a combined point-of-sale system that provides fuel discount pricing.

2. Related Art

Systems and methods exist for correlating a customer's purchases in a grocery store with the purchase of fuel at an affiliated fuel center. Typically, customers earn a fuel discount at the affiliated fuel center according to an amount of money spent on purchasing products in the grocery store itself. The awarded fuel discount is typically calculated as a discount, or savings, per unit (gallon) of fuel. These systems keep track of a customer's awarded fuel discount through the use of a customer loyalty card. Thus, a customer presents his/her loyalty card when making a purchase in the grocery store wherein the store records the purchase and calculates any earned fuel discount. Subsequently, when purchasing fuel at an affiliated fuel center (gas station), upon the presentation of the same customer loyalty card the customer is given the current fuel discount he/she has been awarded previously, thereby reducing the price of the fuel being purchased.

Typically, the existing fuel discount schemes are very limiting. First, they are restricted to a customer only making purchases in the grocery store itself. There is not a provision for the customer to earn, or contribute to, a fuel discount with purchases made at the fuel center itself.

Second, the existing fuel discount schemes are very basic in their calculation. That is, as the customer makes multiple purchases, the system determines whether the customer is entitled to a fuel discount based on that purchase. If the customer does qualify for a fuel discount through his/her current purchase, then the newly awarded discount is added to the existing fuel discount. Thus, the current discount schemes only provide for the aggregation of sequentially earned fuel discounts.

Gift cards are commonplace in various stores, such as Toys R Us and Walmart. In these stores, a customer purchases and activates a gift card for any amount he/she wants wherein the activated gift card may be used for subsequent purchases made in any of the affiliated store. Upon presentation of an active gift card for the purchase of products, the store's system debits the gift card by the amount of the purchase. In the current application of a grocery store being connected to and in communication with an affiliated fuel center, there is no existing method or system for using a gift card in the purchase of fuel.

Therefore, there is a need for a combined in-store and fuel center point-of-sale system that generates fuel discounts based on purchases made either in the store or an affiliated fuel center, that generates a fuel discount based on alternative purchasing habits of a customer and not just on sums total spent in the store, and that accepts and manages the use of gift cards for the purchase of fuel.

SUMMARY OF THE INVENTION

The present invention solves the problems associated with the prior art by providing a combination in-store and fuel center point-of-sale system. A first point-of-sale system is an in-store POS system, such as a grocery store, having a central in-store checkout center connected to at least one checkout terminal or register and a sale information database. The in-store POS system is connected to the corporate headquarters which maintains one or more primary databases containing, but not limited to, marketing data, consumer data, customer data, master sales data, discount data, and merchandise product data. A second point-of-sale system is a fuel center POS system, such as fuel service center, having a central fuel center connected to at least one fuel pump. The fuel center POS system is connected to the in-store POS system such that the fuel center is functionally equivalent to a checkout terminal. The fuel center POS system also has at least one secondary database containing fuel center data for maintaining data on the various product and fuel transactions made.

The headquarters contains a target manager for maintaining information on frequent customers to its stores. In addition, the target manager manages the available fuel discounts and calculates when a customer is eligible to receive a fuel discount. Fuel discounts are based on the customer's purchases made either at an in-store POS system or at a fuel center POS system.

In the present invention, there are five embodiments of a fuel discount which are awarded to a customer as a reduction, or discount, of a unit of fuel. A fuel discount is based on: total purchases, tiered purchases such that the more a customer spends the greater the fuel discount, total number of units of a specific product or type of product purchased, total amount spent on a specific type of product purchased, or total purchases made within a defined time period.

Another aspect of the present invention is the use of a gift card at the fuel center POS system wherein a gift card may be used to purchase products and/or fuel at the fuel center POS system. The management of active gift cards and the use thereof is handled by a third-party gift card payment system such as a bank. The fuel center of the fuel center POS system communicates with the gift card payment system to retrieve and update the available balance on a given gift card, wherein the gift card payment system maintains a gift card database on all gift card accounts. A customer may purchase and activate a gift card at a fuel center, as well as, reload the balance, receive a refund, perform a balance inquiry, and use the gift card to purchase products and/or fuel at the fuel center. At a fuel pump, a customer may perform a balance inquiry and/or purchase fuel using the gift card.

DESCRIPTION OF THE FIGURES

The present invention is described with reference to the accompanying drawings. In the drawings, like reference numbers indicate identical or functionally similar elements. Additionally, the left-most digit(s) of a reference number identifies the drawings in which the reference number first appears.

DETAILED DESCRIPTION OF THE PREFERRED EMBODIMENTS

A. System Architecture

Figure 1:
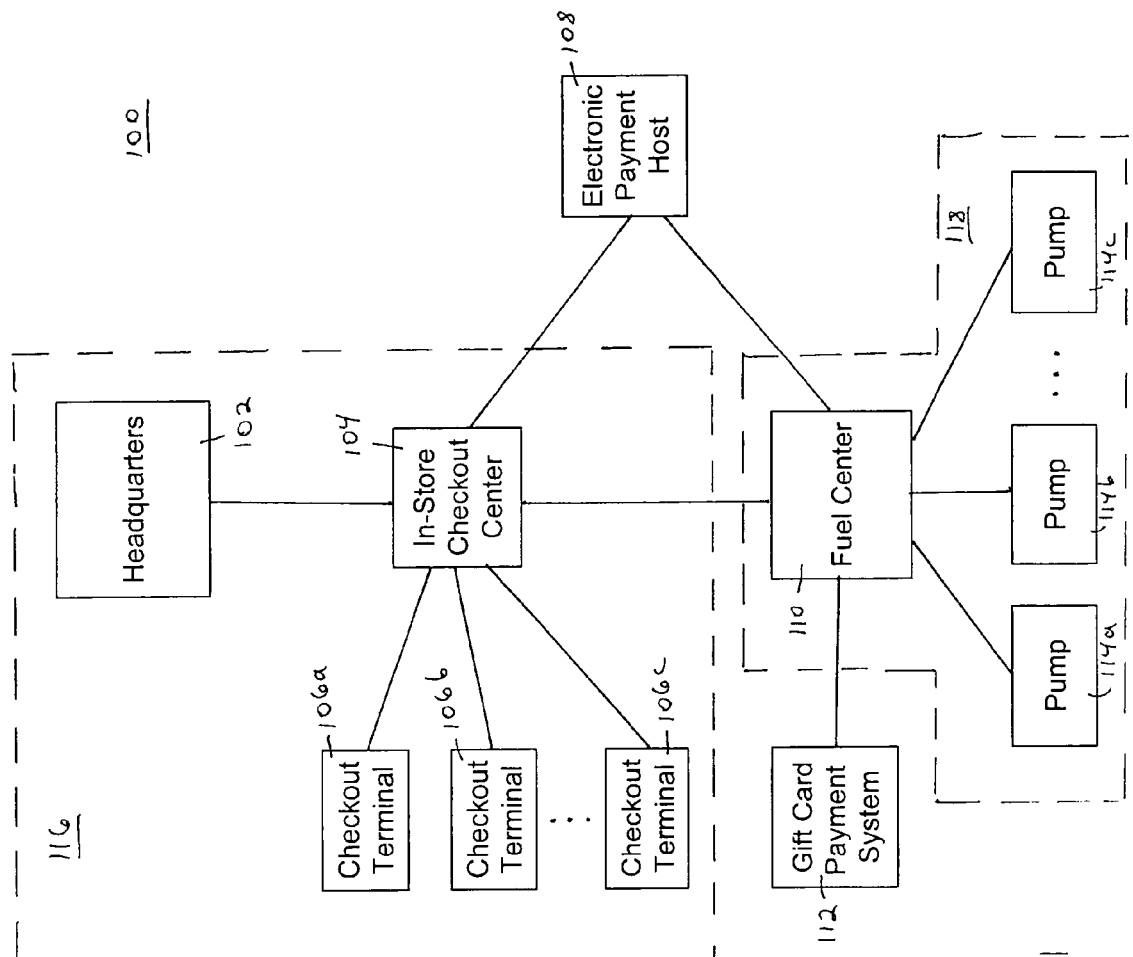
FIG. 1 is a block diagram showing the physical relationship between an in-store system and a fuel center point-of-sale system.

FIG. 1 is a block diagram of the present invention showing the physical relationship between an in-store point-of-sale (POS) system 116 and a fuel center POS system 118. An in-store POS system 116 has an in-store checkout center 104 connected to one or more checkout terminals 106a-c. The in-store POS system 116 is shown having three checkout terminals 106a-c, but that is for convenience purpose only. It would be readily apparent for an in-store POS system 116 to have any number of checkout terminals 106a-c. In the preferred embodiment, the in-store POS system 116 is the main hardware/software system for a grocery store wherein the checkout terminals 106 are the individual electronic cash registers connected to a main hub—the in-store checkout center 104. Thus, each checkout terminal 106 exchanges purchased products information to the in-store checkout center 104 on each transaction, or on each purchase made by a customer. Purchased products information includes, but is not limited to, customer identifying information (if known, such as name and account number), and the name, type (product category, such as, pharmaceutical, meat, dairy, beverage, etc.), and price for each purchased product.

Also in the in-store POS system 116, the in-store checkout center 104 is connected to headquarters 102 such that headquarters 102 and the in-store checkout center 104 share information. For convenience, headquarters 102 is shown as being connected to only one in-store checkout center 104, but this is for convenience. Headquarters 102 can easily be connected to multiple in-store checkout centers 104, each of which is functionally equivalent. An example of this structure is the in-store checkout center 104 being a specific grocery store and the headquarters 104 being a corporate center managing multiple such grocery stores. Thus, the headquarters 102 has a central hardware/software system for communicating to multiple in-store checkout centers 104 or individual stores. The headquarters 102 is responsible for coordinating inventory, pricing and discounts between the different in-store checkout centers 104, as well as, for collecting, analyzing, and providing customer, marketing, and demographic information for the individual in-store checkout centers 104.

A fuel center POS system 118 is also connected to and in communication with the in-store POS system 116. The fuel center POS system 118 has a fuel center 110 connected to one or more fuel pumps 114a-c. The fuel center POS system 118 is shown having three pumps 114a-c, but that is for convenience purpose only. It would be readily apparent for a fuel center POS system 118 to have any number of fuel pumps 114a-c. In the preferred embodiment, the fuel center POS system 118 is the main hardware/software system for managing the fuel station affiliated with a specific grocery store wherein the pumps 114 are the individual fuel dispensing machines connected to the main fuel center 110. Typically, the fuel center POS system 110 is in physical proximity to the in-store POS system 116, such as in the front parking lot.

In operation, each pump 114a-c exchanges purchased fuel information to the fuel center 110 on each transaction, or on each purchase of fuel made by a customer, at a pump 114. Purchased fuel information includes, but is not limited to, customer identifying information (if known, such as name and account number) and the quantity, type, and price of fuel for each purchase. The fuel center 110 stores the information as well as sends all purchased fuel information to the in-store checkout center 104 of the in-store POS system 116. Thus, the fuel center POS system 118 functions as another checkout terminal 106 as far as the in-store checkout center 104 is concerned.

In the preferred embodiment, the fuel center POS system 116 also communicates with a gift card payment system 112 which is a third party entity, such as a bank, that manages the issuance, activation, and use of a gift card directed to the purchase of fuel. A gift card of the present invention is a conventional magnetic card having a magnetic strip or a smart card with a memory chip which contains either an available dollar amount or a link to an account specifying an available dollar amount.

Also in the present invention is an electronic payment host 108 which is a third party entity, such as a credit card processing center. Both the in-store POS system 116 and the fuel center POS system 118 communicate with the electronic payment host 108 and exchange payment information when a customer is paying for fuel and/or products with a bank card or a credit card. Alternatively, in another embodiment, only the in-store POS system 116 communicates with the electronic payment host 108 such that the fuel center POS system 118 communicates with the electronic payment host 108 through the in-store POS system 116.

Specifically, if a customer is paying for products at a checkout terminal 106, paying for fuel at a pump 114, or paying for products and fuel at a fuel center 110 with a bank or credit card, the respective in-store checkout center 104 or fuel center 110 sends electronic payment information to the electronic payment host 108 in order to receive authorization to accept such payment from the customer. Electronic payment information is retrieved from a customer's card in the conventional way by reading the customer's name and account from the card via a magnetic strip reading device. Once the electronic payment host 108 sends back authorization for the purchase to the in-store checkout center 104 or fuel center 110, the purchase is completed and confirmation of the transaction is made.

Figure 2:
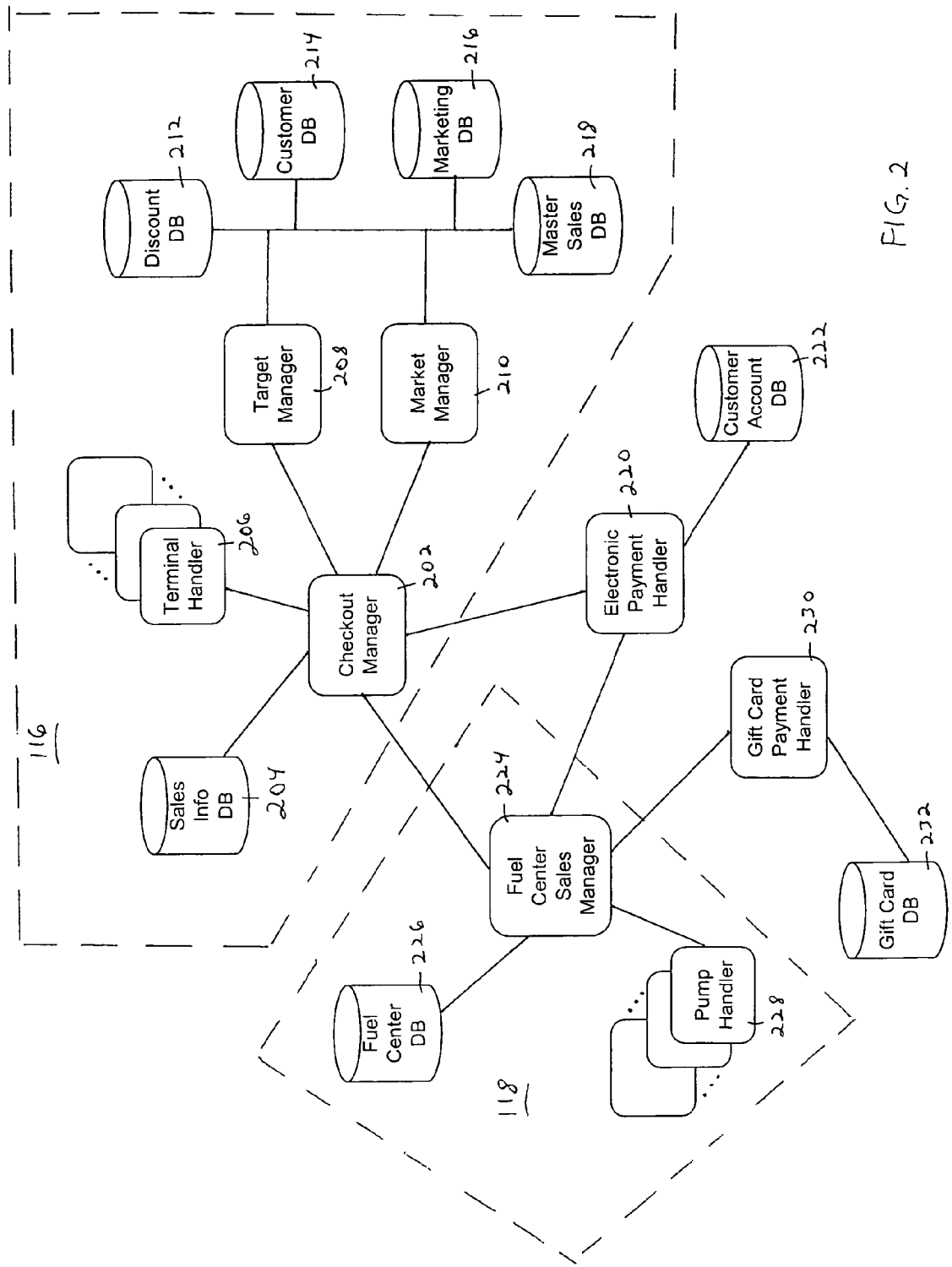
FIG. 2 is a block diagram showing the communication paths between the software subsystems controlling the in-store and fuel center point-of-sale systems.

Similar to FIG. 1, FIG. 2 is a block diagram showing the communication paths between the software subsystems or programs of the in-store POS system 116 and the fuel center POS system 118. Regarding the in-store POS system 116, a check-out manager 202 is a software program for handling the functionality of the in-store checkout center 104, whereas a terminal handler 206 is a software program for handling the transactions made on a specific checkout terminal 106a-c. Thus, the checkout manager 202 exchanges purchase and sales data with each terminal handler 206—one for each checkout terminal 106a-c. Also, the checkout manager 202 stores sales information, as well as, other information such as inventory data, etc., in a sales information database 204.

In the preferred embodiment, the checkout manager 202, terminal handlers 206, and sales information database 204 are connected together and operate as a Local Area Network (LAN). A LAN is a computer network covering a local geographic area such as all of the computer hardware devices located within a grocery store. A typical LAN may use a combination of different network architectures and infrastructures including, but not limited to, wireless Wi-Fi (IEEE 802.11(x) standard) and Ethernet (IEEE 802.3 standard—wired and fiberoptic) networks. It would be readily apparent to one of ordinary skill in the relevant art to implement the in-store POS system 116 as a LAN.

Also, the in-store POS system 116 employs a commercially available hardware and software system that has been customized according to the features and aspects of the present invention described herein. In the preferred embodiment, the in-store POS system 116 uses a supermarket application by International Business Machines, Inc. (IBM). For example, IBM offers an IBM SurePOS ACE for 4690 operating system as well as a 4680-4690 Supermarket Application. Therefore, the in-store checkout center 104, checkout manager 202, checkout terminals 106, and terminal handlers 206 use the IBM hardware and software system for communication and operation of the in-store POS system 116. It would be readily apparent to one of ordinary skill in the relevant art to modify and customize the IBM system to operate and function as in the present invention.

The headquarters 102 executes, among others, two software programs, target manager 208 and market manager 210, which are connected via a LAN and are used to manage information in one or more primary databases. These programs may be software or a database tool capable of evaluating, manipulating, or inspecting data that is stored either locally on a server or remotely. In the preferred embodiment, the target manager 208 is a database management system, such as Target Expert sold by Valassis Relationship Marketing Systems, LLC of Shelton Conn., and the market manager 210 also is a database analysis or manipulation system, such as Market Expert sold by Valassis Relationship Marketing System. In addition, the IBM ACE system discussed above processes all electronic marketing and Target Expert messaging, including customer loyalty card numbers.

In the preferred embodiment, the primary databases are a discount database 212, a customer database 214, a marketing database 216, and a master sales database 218. The use of four separate databases is for convenience. It would be readily apparent to one of ordinary skill in the relevant art to implement the headquarters 102 using any number of databases that contain marketing data, consumer data, customer data, master sales data, discount data, and merchandise product data. The discount database 218 preferably contains information on the discount and promotional schemes currently available to customers of the in-store POS system 116 and the fuel center POS system 118. That is, the discount database 218 contains the minimum and maximum spending thresholds to earn a fuel discount, the number of products or type of products needed to be purchased for a fuel discount, the time period and minimum spending threshold for earning a fuel discount, and the pre-defined fuel discount associated with each such available discount scheme. The customer database 214 preferably contains information on each of such customers, including, but not limited to, customer identification, name, address, account number, purchase history, demographic information, and similar data items. The marketing database 216 preferably contains information on product sales history, demographic information, long-term customers, and historical information on marketing plans. The master sales database 218 preferably contains sales information for each in-store checkout center 104, merchandise and products information, and purchasing trends.

The checkout manager 202 for a given store is connected to the target manager 208 and market manager 210 at headquarters 102 via a Wide Area Network (WAN) due to the possibility that the different stores, or in-store POS systems 116, are typically located far from the headquarters 102. A WAN typically covers a wide geographic area with large numbers of computers. The Internet is an example of a WAN. Also, a WAN network may be comprised of a number of separate LANs networked together over external network interfaces, including virtual tunnels such as Virtual Private Networks (VPN) constructed through a public medium such as the Internet.

Similar to the in-store POS system 116, the fuel center POS system 118 has a fuel center sales manager 224 which is a software program for handling the functionality of the fuel center 110, whereas a pump handler 228 is a software program for handling the transactions made on a specific fuel pump 114a-c. Thus, the fuel center sales manager 228 exchanges fuel purchases with each pump handler 228—one for each pump 114a-c. The fuel center sales manager 224 stores fuel sales information in a fuel center database 226. In addition, a customer may purchase products in the fuel center 110 which often offers for sale various sundry items, such as, snacks, beverages, tobacco products, toiletries, etc. Thus, the fuel center sales manager 224 stores the sales information for these purchased products, also in the fuel center database 226.

The fuel center POS system 118 employs a commercially available hardware and software system that has been customized according to the features and aspects of the present invention described herein. In the preferred embodiment, the fuel center POS system 118 uses a fuel center system by Radiant Systems (Radiant). For example, Radiant offers a Radiant Fuel POS for grocery and high-volume retailers. Therefore, the fuel center 110 and fuel center sales manager 224 use the Radiant hardware and software system for communication and operation of the fuel center POS system 118. In addition, IBM and Radiant have teamed together so that the Radiant system at the fuel center 110 is compatible, regarding communications and operations, with the IBM system at the in-store checkout center 104. The preferred embodiment of the present invention uses available Dresser-Wayne fuel pumps which also have been modified and customized to operate as described herein. It would be readily apparent to one of ordinary skill in the relevant art to modify and customize the Radiant system and Dresser-Wayne fuel pumps to operate and function as in the present invention.

The fuel center sales manager 224 of the fuel center POS system 118 is connected to the checkout manager 202 of the in-store POS system 116 as part of a WAN or LAN network. As discussed above, the fuel center sales manager 224 functionally operates as a terminal handler 206 such that the fuel center sales manager 224 sends the checkout manager 202 reports on the sales transactions of the fuel center POS system 118 similar to such reports from a terminal handler 206 to the checkout manager 202. The reports contains information on each sales transaction made either at a pump 114 or at the fuel center 110, including, customer identifying information (if any), product information (bar code, type, number, price, etc.), fuel quantity and price, and any applied discount.

The fuel center sales manager 224 is also connected via a WAN to a gift card payment handler 230 of a gift card payment system 112. The gift card payment handler 230 is a software program managing the activation and use of a gift card. The gift card payment handler 230 maintains information on both available and activated cards in a gift card database 232.

Operationally, a customer may activate a gift card at a fuel center 110 by purchasing the gift card and activating it with an initial amount of funds. The gift card may then be used to purchase fuel at a pump 114 or to purchase products and fuel at a fuel center 110. For all gift card transactions, the fuel center sales manager 224 communicates with the gift card payment handler 230 to oversee the use of the gift card and to maintain a current balance available on the gift card in the gift card database 232.

Both the checkout manager 202 of the in-store POS system 116 and the fuel center sales manager 224 of the fuel center POS system 118 are connected to and communicate with an electronic payment handler 220 of an electronic payment host 108. The electronic payment handler 220 is connected to the checkout manager 202 or fuel center sales manager 224 through a WAN. The electronic payment handler 220 is a software program that handles the processing of a credit or bank card payment. Therefore, when a customer at a checkout terminal 106, a pump 114, or a fuel center 224 wants to use a credit or bank card for paying for products and/or fuel, the checkout manager 202 or fuel center sales manager 224 communicates with the electronic payment handler 220 to complete such a transaction. Specifically, the checkout manager 202 or fuel center sales manager 224 provides account information and a payment total to the electronic payment handler 220. The electronic payment handler 220 accesses a customer account database 222 to determine if the requested transaction is allowable, such as the customer's card is valid and/or the customer is not exceeding a maximum credit limit with the requested purchase. If the transaction is approved, the electronic payment handler 220 sends an approval to the requesting checkout manager 202 or fuel center sales manager 224, as well as, records the transaction in the customer account database 222. In an alternative embodiment, the fuel center sales manager 224 is not directly connected to the electronic payment handler 220, but rather communicates with the electronic payment handler 220 via the checkout manager 202.

B. System Operation

Figure 3:
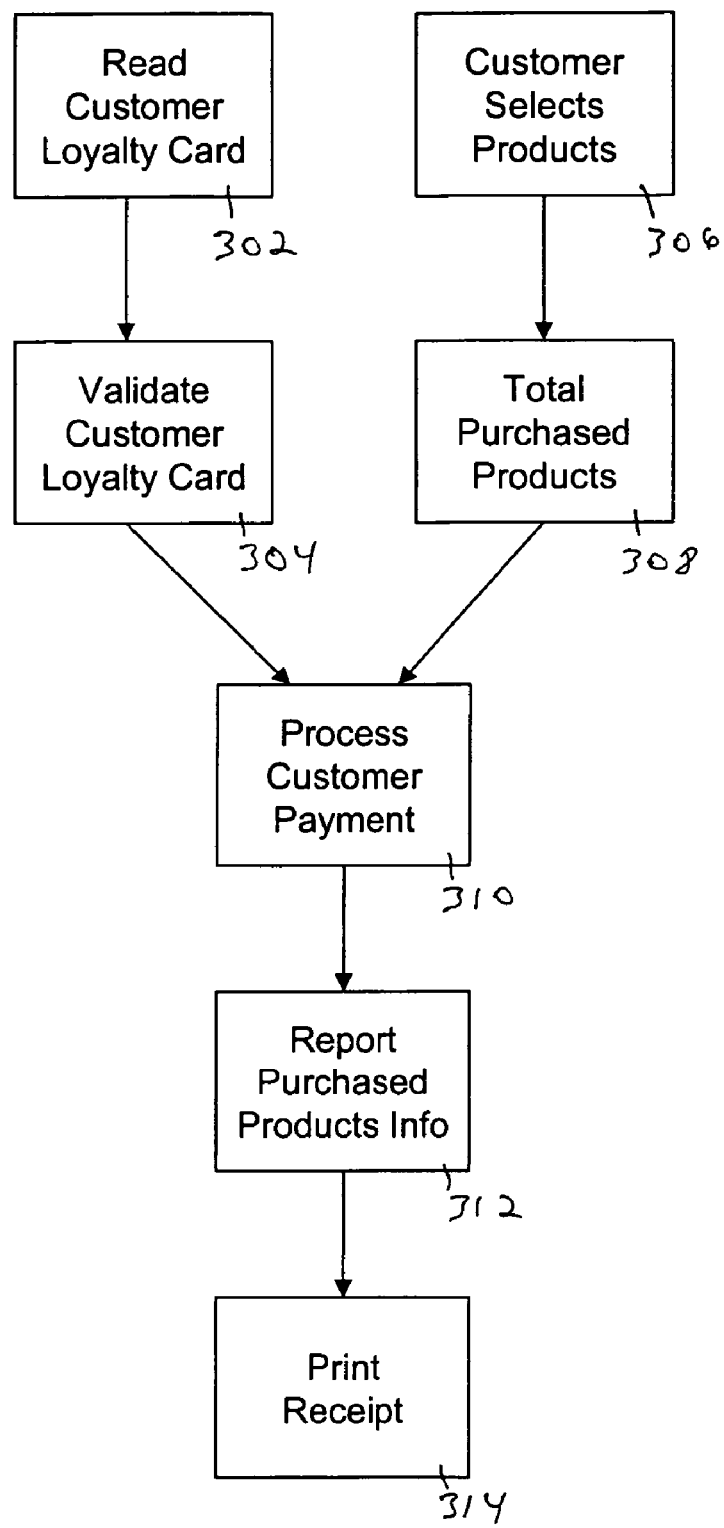
FIG. 3 is an operational flow diagram showing a checkout terminal of an in-store POS system processing a customer's purchase of products.

FIG. 3 is an operational flow diagram of a terminal handler 206 of a checkout terminal 106 of an in-store POS system 116 for processing a customer's purchase of products in a store. Processing begins at either 302 directed to reading a customer's loyalty card or step 306 directed to the customer selecting one or more products for purchase and presenting them for purchase. A customer loyalty card is preferably a card having a magnetic strip containing customer identifying information such as a name and account number. The headquarters 102 for the in-store POS system 116 uses customer loyalty cards as a means for tracking regular customers and their purchasing preferences and trends, as well as, for creating and offering various product and fuel discounts. In step 302, the customer presents his/her loyalty card for reading which is read by conventional means using a bar code reader, a magnetic strip reader, or a digital image reader. Continuing to step 304, the terminal handler 206 validates the customer loyalty card by conventional means, including, exchanging the customer identifying information contained on the customer loyalty card with the checkout manager 202. The checkout manager 202 may confirm the validation of the presented loyalty card by accessing a local database, such as the sales information database 204. Alternatively, the checkout manager 202 exchanges such information with the target manager 208 at headquarters 102 wherein the target manager 208 accesses a customer database 214 to validate the customer loyalty card. A customer loyalty card is validated by retrieving a database record corresponding to the account number on the presented card, then verifying that the database record has a data field indicating that the card is valid and/or active. The validation information is sent back to the terminal handler 206. Once the customer loyalty card is validated, processing proceeds to step 310.

Returning to step 306, a customer presents one or more products for purchase at the checkout terminal 106. The terminal handler 206 scans in the bar code, or otherwise enters the price, for each selected product and, proceeding to step 308, calculates a total cost for all such selected products. Once a total is calculated, processing proceeds to step 310.

It should be noted that a customer may present his/her customer loyalty card at any time during the purchasing process. Once a customer enters a valid customer loyalty card, any discount pricing on a purchased product may be shown at the time of presenting the product for purchase, or at the end of all purchased products when the terminal handler 206 is calculating a total price owed. Also, to calculate the total price, for each selected product the terminal handler 206 queries the checkout manager 202 which provides a regular price and a discounted price based on the product purchased and customer information via the sales information database 204 and potentially the target manager 208 and market manager 210.

After the customer is presented with a total price for the purchased products, processing continues to step 310 wherein the customer submits payment to the terminal handler 206. Payment may be in the form of cash, check, or a gift, credit or bank card, or a combination thereof. The terminal handler 206 processes the customer's payment by conventional means. However, if the customer submits payment by a credit or bank card, the terminal handler 206 submits the payment request, including the customer's card/account number, type of card, card's sponsoring institution (bank name), and the total purchase amount, to the checkout manager 202. The checkout manager 202 in turn submits the payment request to the electronic payment handler 220. Accessing the customer account database 222, the electronic payment handler 220 determines whether to authorize the payment request as discussed above. The electronic payment handler 220 returns an authorization code to the checkout manager 202 which in turn passes the authorization code to the requesting terminal handler 206. Alternatively, the checkout manager 202 handles the entire payment request with the electronic payment handler 220 and returns to the requesting terminal handler 206 an image of a receipt for printing.

After receiving payment for the purchased products, the terminal handler 206 continues to step 312 wherein it reports information on the list of purchased products to headquarters 102. Specifically, the terminal handler 206 forwards the purchased products information to the checkout manager 202 which stores the purchase information in the sales information database 204, as well as, forwards the same information to the target manager 208 and market manager 210. The target manager 208 parses the information and stores it in various primary databases, such as the customer database 214 and master sales database 218. The target manager 208 also uses the received information to determine whether the current customer who purchased the products is eligible for a fuel discount. The processing of the target manager 208 is discussed in more detail below with respect to FIG. 6. The target manager 208 also sends a notice back to the checkout manager 202 whether the current customer has received a fuel discount due to the current purchase. The checkout manager 202 forwards this information to the terminal handler 206 to notify the customer.

The terminal handler 206 then proceeds to step 314 wherein it prints the customer a receipt for the purchase. The bottom of the receipt contains a notice stating whether the customer has received a fuel discount and if so, contains the details of that fuel discount in terms of a discount per unit (gallon) of fuel. The terminal handler's 206 processing of the current customer is then complete.

Figure 4:
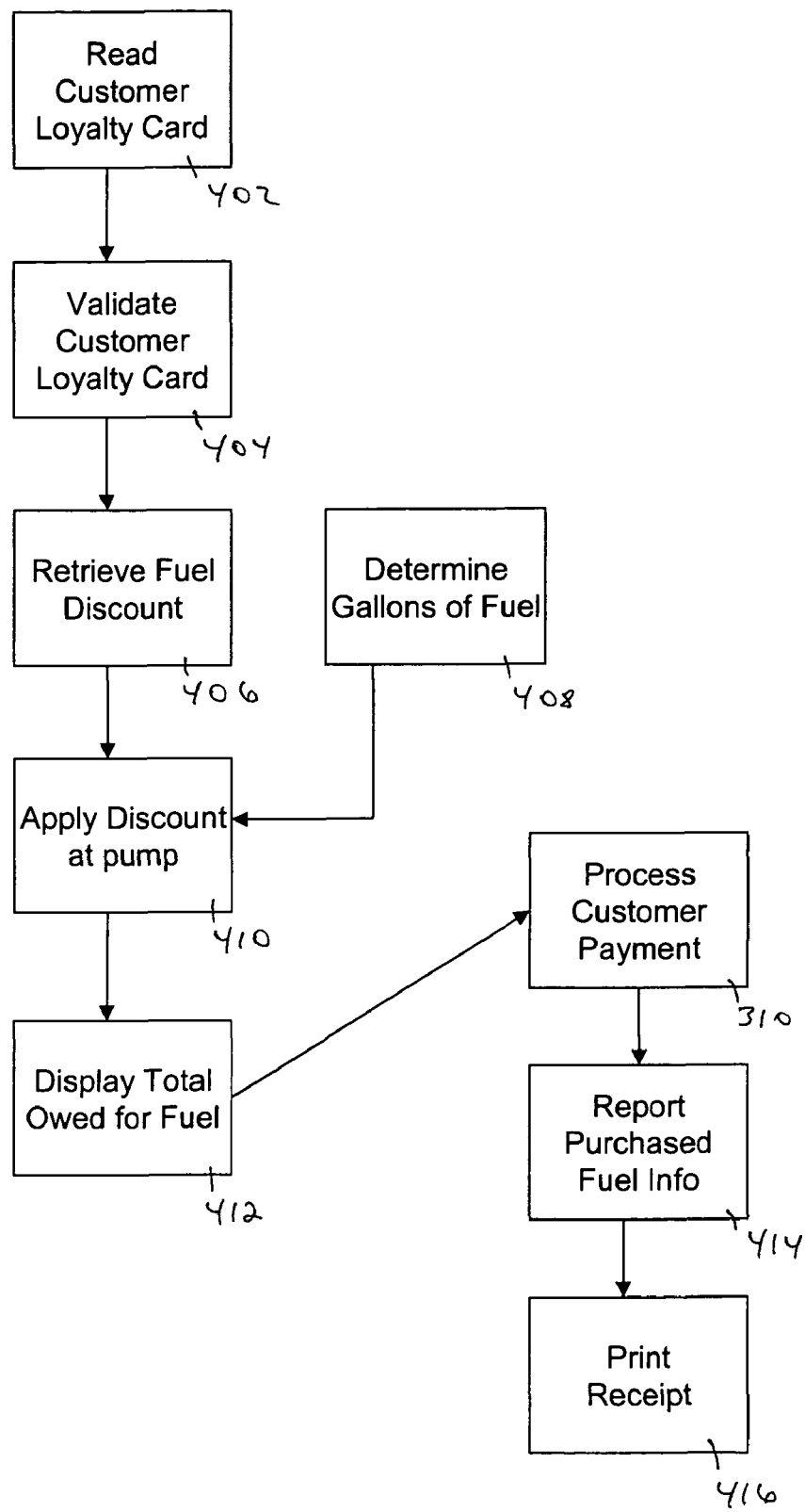
FIG. 4 is an operational flow diagram showing a pump of a fuel center POS system processing a customer's purchase of fuel.

FIG. 4 is an operational flow diagram for a pump handler 228 of a pump 114 processing a customer's purchase of fuel at that pump 114. Processing begins at 402 directed to reading a customer's loyalty card. After reading the customer loyalty card, processing continues to step 404 wherein the pump handler 228 validates the card. The pump handler 228 processes a customer loyalty card in the same manner as discussed above in step 304 with the only difference being that the pump handler 228 communicates with the checkout manager 202 via the fuel center sales manager 224. Once the customer loyalty card is validated, processing proceeds to step 406.

After the pump handler 228 validates the customer loyalty card, the pump handler 228 communicates with the target manager 208 to retrieve the highest fuel discount available to the current customer. In the preferred embodiment, the pump handler 228 receives the available fuel discount at the same time it receives the validation of the customer loyalty card such that the discount information (discount per unit or gallon of fuel) is contained in the same customer data record. Alternatively, the pump handler 228 may access the fuel center sales manager 224 a second time requesting the fuel discount information for the current customer. The fuel center sales manager 224 communicates with the target manager 208 at headquarters 102 via the checkout manager 202 in the in-store POS system 116.

In addition, for each customer, the target manager 208 maintains a list of earned fuel discounts. That is, a customer earns a separate fuel discount based on certain purchases, the details of which are described below. Therefore, in the preferred embodiment, the target manager 208 returns the highest fuel discount contained in a customer's list of available fuel discounts. This ensures that a customer always receives the lowest available price for fuel at a fuel center POS system 118.

After the pump handler 208 receives the fuel discount, processing continues to step 410 wherein the pump handler 208 applies the discount to the amount of fuel being purchased in step 408. That is, in step 408, the customer accesses the pump 114 in a conventional manner and pumps gas into his/her vehicle or approved fuel container. Therefore, in step 410, the pump handler 228 applies the fuel discount to the gas being pumped by the customer in step 408. In the preferred embodiment, the discount is applied immediately to the pumped gas such that the price shown on the display at the pump 114 reflects the discounted price. Once the customer is finished pumping gas, processing proceeds to step 412 at which time the pump handler 228 displays the total purchase price owed for the pumped fuel. Alternatively, if the customer presents a valid customer loyalty card at the end of the purchase of fuel, the pump handler 228 retrieves the available fuel discount as described above and then applies that fuel discount to the amount of pumped fuel, thereby generating a discounted balance owed.

Processing continues to step 310 wherein the customer pays for the pumped gas at the pump 114. The pump handler 228 processes the customer's payment for fuel at the pump 114 by either gift, credit or bank card in the same manner as described above with respect to the terminal handler 206. However, when paying at the pump 114, the pump handler 228 communicates with the electronic payment handler 220 via the fuel center sales manager 224. Specifically, the pump handler 228 submits the payment request, including the customer's card/account number, type of card, card's sponsoring institution (bank name), and the total purchase amount, to the fuel center sales manager 224 which in turn submits the payment request to the electronic payment handler 220 or a gift card payment handler 230 described in detail below. Accessing the customer account database 222, the electronic payment handler 220 determines whether to authorize the payment request as discussed above. The electronic payment handler 220 returns an authorization code to the fuel center sales manager 224 which passes the authorization code to the requesting pump handler 228. Alternatively, as discussed above with respect to the checkout manager 202, the fuel center sales manager 224 may handle the entire transaction internally and simply send an image of a receipt to the pump handler 228 for printing.

After receiving payment for the purchased fuel, the pump handler 228 continues to step 414 wherein it reports information on the purchased fuel to headquarters 102. Specifically, the pump handler 228 forwards the purchased fuel information to the fuel center sales manager 224 which stores the information in the fuel center database 226, as well as, forwards the same information to the checkout manager 202. Alternatively, upon receipt of payment, the fuel center sales manager 224 reports the purchase of fuel to headquarters 102. The checkout manager 202 records the information in its sales information database 204 as well as passes the information to the target manager 208 and market manager 210 at headquarters 102. The target manager 208 parses the information and stores it in various primary databases, such as the customer database 214, master sales database 218, and marketing database 216. Regarding the customer database 214, the target manager 208 records the fact that the customer used a fuel discount, thereby updating the customer's account to reflect the current purchase of fuel. The processing of the target manager 208 is discussed in more detail below with respect to FIG. 6.

The pump handler 228 then proceeds to step 416 wherein it prints the customer a receipt for the fuel purchased. The pump handler's 228 processing of the current customer's purchase of fuel at the pump 114 is then complete.

Figure 5:
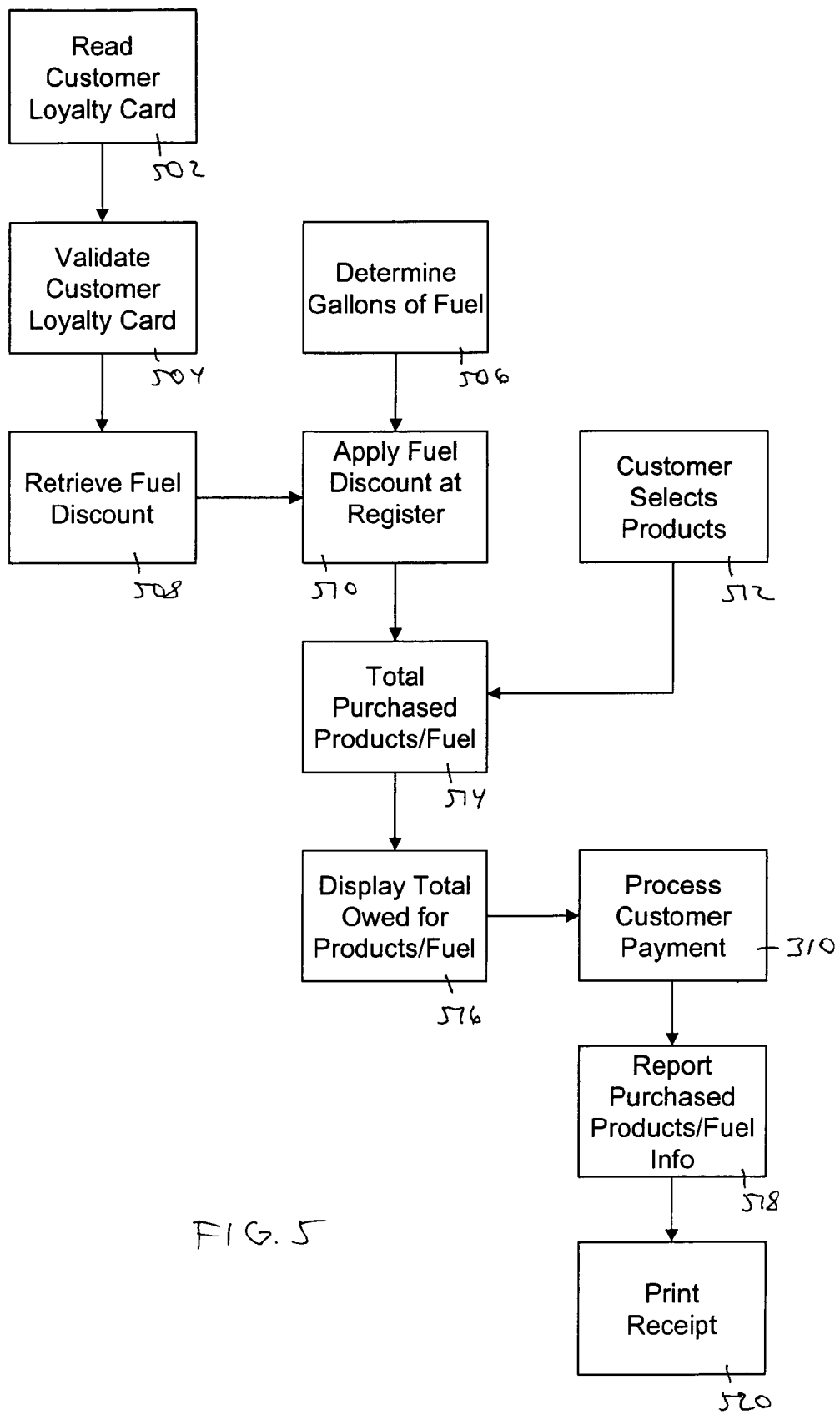
FIG. 5 is an operational flow diagram showing a fuel center of a fuel center POS system processing a customer's purchase of fuel and products.

FIG. 5 is an operational flow diagram showing a fuel center sales manager 224 of a fuel center 110 processing a customer's purchase of fuel and products. Processing begins at 502 directed to reading a customer's loyalty card. After reading the customer loyalty card, processing continues to step 504 wherein the fuel center sales manager 224 validates the card. The fuel center sales manager 224 processes a customer loyalty card in the same manner as discussed above in steps 304, 404 with the only difference being that the fuel center sales manager 224 communicates directly with the checkout manager 202. Once the customer loyalty card is validated, processing proceeds to step 508.

After the fuel center sales manager 224 validates the customer loyalty card, the fuel center sales manager 224 retrieves the highest fuel discount available to the current customer. In the preferred embodiment, and as described above, the fuel center sales manager 224 preferably receives the available fuel discount at the same time it receives the validation of the customer loyalty card such that the discount information (discount per unit or gallon of fuel) is contained in the same data record. Alternatively, the fuel center sales manager 224 may communicate with headquarters 102 a second time requesting the fuel discount information. The fuel center sales manager 224 communicates with headquarters 102 via the checkout manager 202 in the in-store POS system 116. Also, as discussed, the returned fuel discount is the highest fuel discount in the customer's list of available fuel discounts.

After the fuel center sales manager 224 receives the fuel discount, processing continues to step 510 wherein the fuel center sales manager 224 applies the discount to the amount of fuel being purchased in step 506. That is, in step 506, the customer accesses the pump 114 in a conventional manner and pumps gas into his/her vehicle or approved fuel container wherein the non-discounted price of fuel is shown on the pump 114. Therefore, in step 510, the fuel center sales manager 224 applies the fuel discount to the gas being pumped by the customer in step 506.

Alternatively, and in the preferred embodiment, the customer may also present his/her customer loyalty card at the pump 114, see FIG. 4, such that the fuel discount is applied immediately to the pumped gas such that the price shown on the display at the pump 114 reflects the discounted price. Regardless, once the customer is finished pumping gas, processing proceeds to step 514.

Similar to the processing of FIG. 3, in step 512 a customer presents one or more products for purchase at the fuel center 110. The fuel center sales manager 224 scans in the bar code, or otherwise enters the price, for each selected product and proceeds to step 514.

It should be noted that a customer may present his/her customer loyalty card at any time during the purchasing process at the fuel center 110 either at the pump 114 and/or at the fuel center 110. Also, once a customer enters a valid customer loyalty card, any discount pricing on a purchased product may be shown at the time of presenting the product for purchase, or summarized when the fuel center sales manager 224 is calculating a total price owed. Similarly, upon the presentation of a valid customer loyalty card, even after the purchased products and fuel are totaled, the fuel center sales manager 224 may reduce the price of the pumped fuel according to the received fuel discount. A fuel discount, however, may only be used once.

In step 514, the fuel center sales manager 224 calculates a total cost for all such selected products as well as the pumped fuel taking into account the fuel discount received from the target manager 208 as well as any available product discounts. Once a total is calculated, processing proceeds to step 516 at which time the fuel center sales manager 224 displays the total purchase price owed for the purchased products and the pumped fuel.

Processing continues to step 310 wherein the customer pays for the purchased products and the pumped gas at the pump 114. Because the customer is paying at the fuel center 110 and not at a pump 114, payment may be in the form of cash, check, or a gift, credit or bank card. The fuel center sales manager 224 processes the customer's payment by conventional means. However, if the customer submits payment by a credit or bank card, the fuel center sales manager 224 submits the payment request, including the customer's card/account number, type of card, card's sponsoring institution (bank name), and the total purchase amount, to the electronic payment host 108 as described above.

After receiving payment for the purchased products and fuel, the fuel center sales manager 224 continues to step 518 wherein it reports information on the purchased products and fuel to headquarters 102. Specifically, the fuel center sales manager 224 stores the purchased products and fuel information in the fuel center database 226, as well as, forwards the same information to the checkout manager 202 of the in-store POS system 116. The checkout manager 202 records the information in its sales information database 204 as well as passes the information to the target manager 208 and market manager 210 at headquarters 102 in the same manner as described above. The target manager 208 parses the information and stores it in various primary databases, such as the customer database 214, master sales database 218, and marketing database 218. Regarding the customer database 214, the target manager 208 records the fact that the customer used a fuel discount, thereby updating the customer's account to reflect the current purchase. The processing of the target manager 208 is discussed in more detail below with respect to FIG. 6.

The fuel center sales manager 224 then proceeds to step 520 wherein it prints the customer a receipt for the products and fuel purchase. The fuel center sales manager 224 processing of the current customer's purchase of products and fuel at the fuel center 110 is then complete.

Figure 6:
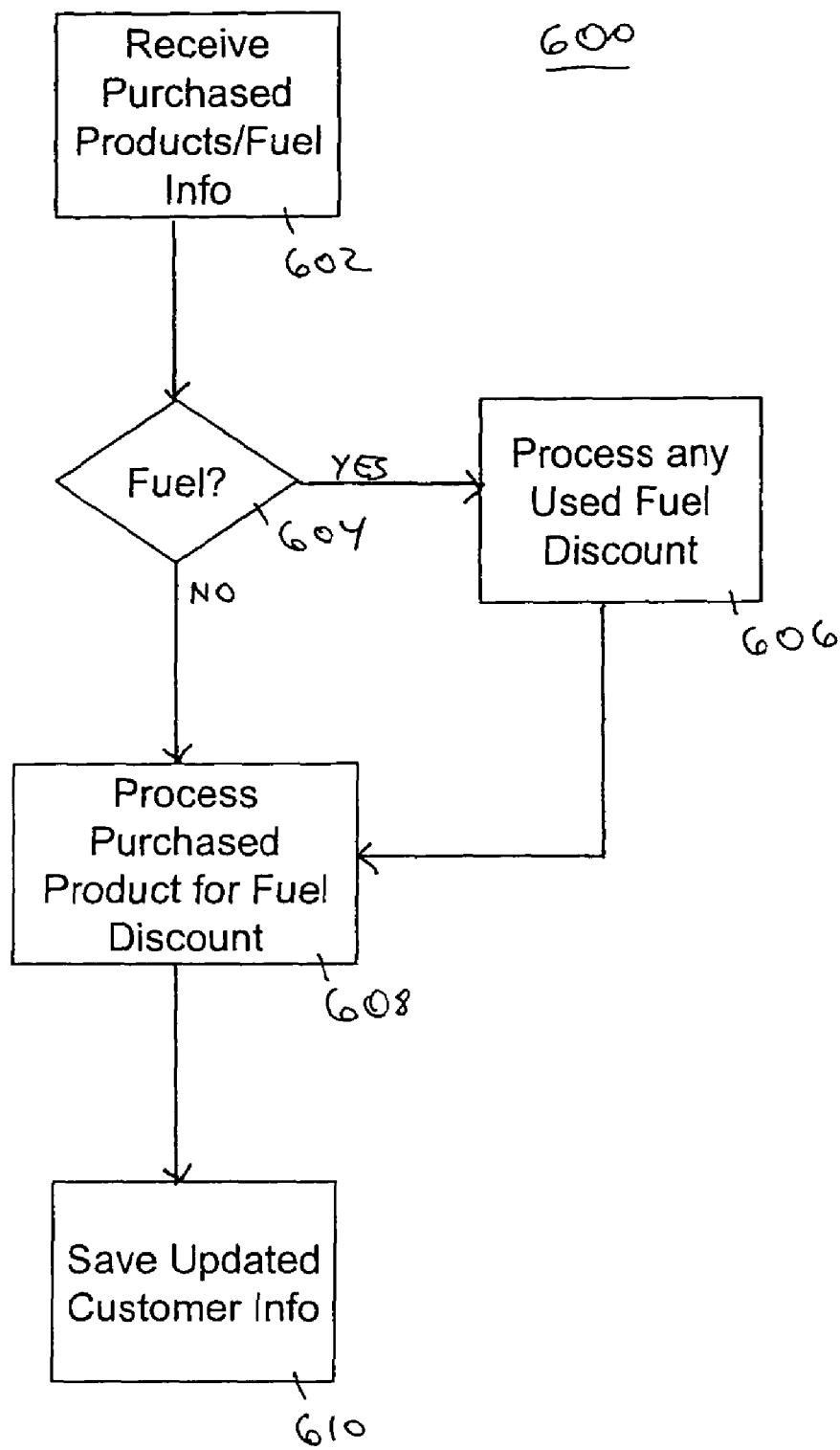
FIG. 6 is an operational flow diagram showing the target manager's processing of a customer's purchase of fuel and/or products.

FIG. 6 is an operational flow diagram showing a target manager 208 processing a customer's purchase of fuel and/or products. Processing begins at step 602 wherein the target manager 208 receives information on purchased products and/or fuel from the checkout manager 202. Specifically, this step is initiated by either step 312 from the terminal handler 206 (customer purchases one or more products at a checkout terminal 106), step 414 from a pump handler 228 (customer purchases fuel at a pump 114), or step 518 from a fuel center sales manager 224 (customer purchases fuel and/or products at a fuel center 110). Upon receipt of the purchase information, processing proceeds to step 604.

In step 604, the target manager 208 determines whether any fuel was purchased. If no fuel was purchased, processing continues to step 608 wherein the target manager 208 processes the purchased products to determine whether a fuel discount should be given to the customer. If fuel was purchased, processing continues from step 604 to step 606 wherein the target manager 208 processes any fuel discount used by the customer in the instant purchase. In step 606, the target manager 208 parses the purchased products and fuel information and determines whether a fuel discount was used during the customer's purchase of fuel. If it was, then the target manager 208 updates the customer database 214 to reflect the use of the fuel discount. If no fuel discount was used during the instant purchase, the target manager 208 proceeds to step 608.

In the preferred embodiment, a customer accumulates multiple fuel discounts such that each earned fuel discount is stored in a list of available fuel discounts in the customer's record in the customer database 214. Thus, the target manager 208 removes the used fuel discount entry from the customer's list of available fuel discounts. It is important to note that each earned fuel discount is only used once by a customer.

In step 608, the target manager 208 determines whether the instant purchase of products satisfies the criteria for awarding the customer a fuel discount. There are several different methods for calculating and awarding a fuel discount. The different fuel discount schemes are described in greater detail below with respect to FIGS. 7-11. After processing the purchased products for a fuel discount, the target manager 208 continues to step 610 wherein any changes to the customers record is saved in the customer database 214.

Figure 7:
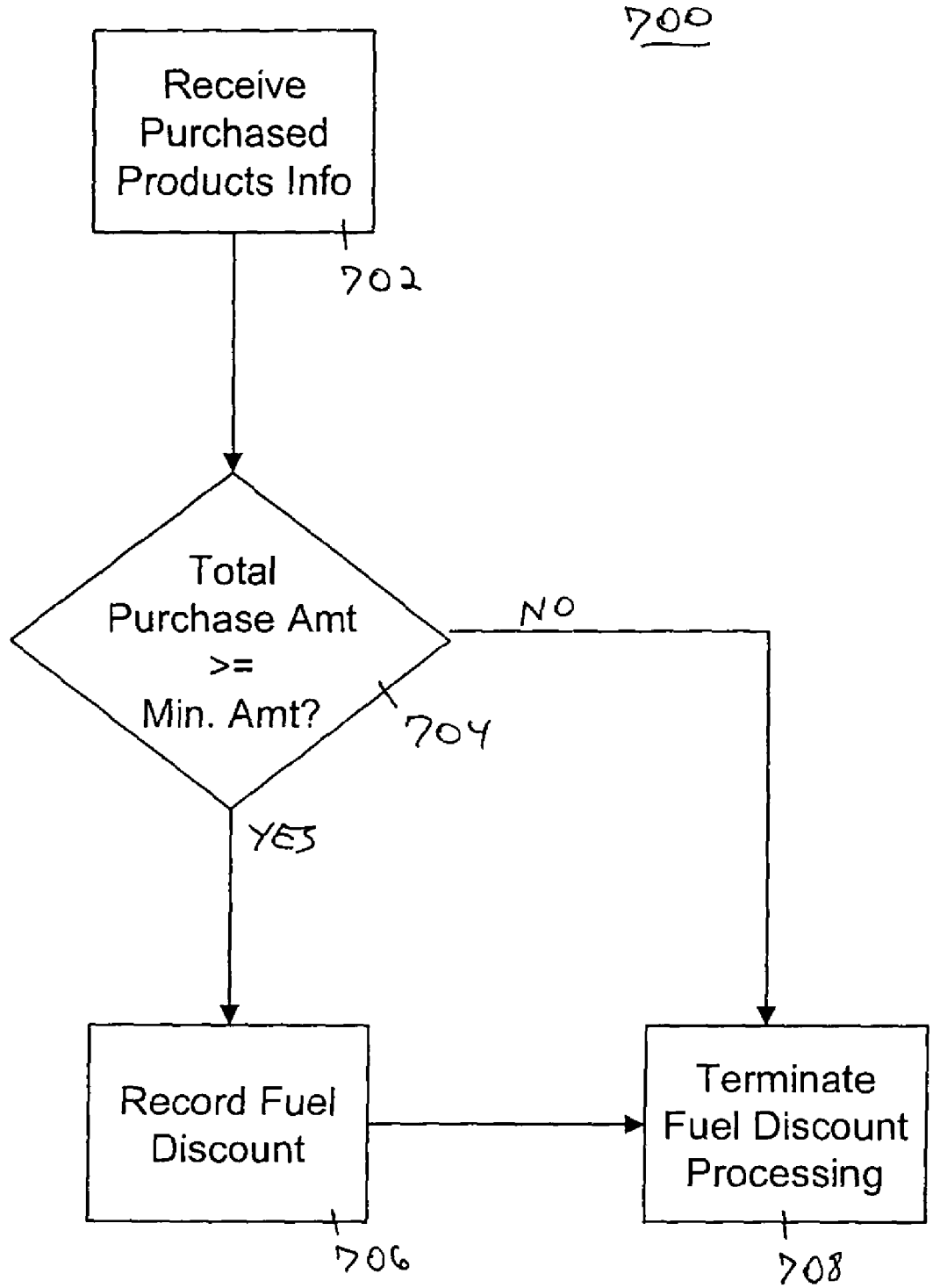
FIG. 7 is an operational flow diagram showing the calculation of a first type of fuel discount.

FIG. 7 is an operation flow diagram showing the calculation of a first type of fuel discount. In this embodiment, a customer is awarded a fuel discount once he or she has achieved a predefined spending threshold. Thus, the customer qualifies for the discount when spending a total amount in the store. Starting at step 702, the target manager 208 receives the purchased products information. Continuing to step 704, the target manager 208 determines whether the total purchase amount of all the purchased products is greater than or equal to a minimum threshold amount. If the minimum threshold has been met, then the customer is awarded a fuel discount quantified in terms of a pre-defined discount per unit of fuel. For example, if a customer spends $30.00 in total, he or she earns a $0.03 per gallon fuel discount.

There are also two variations of this fuel discount scheme. That is, in one embodiment, the total purchase amount may be calculated as the total amount that the customer spent in the instant transaction only. Thus, the customer must have spent the minimum threshold amount in one transaction. In this embodiment, the target manager 208 simply compares the total purchase amount received from the checkout manager 202 for the given customer for the given transaction to the minimum threshold amount. Alternatively, in a second embodiment, the total purchase amount is the aggregate amount spent by the customer in all of the customer's transactions either at the in-store POS system 116 or the fuel center POS system 118. Thus, the customer must have spent the minimum threshold amount as calculated by adding the instant transaction total to the previous amounts spent by the customer in all previous transactions. The target manager 208 simply adds the instant total purchase amount received from the checkout manager 202 for the given customer to a running total of all purchases made by the customer (as stored in the customer database 214 in the customer's record) to generate an aggregate total purchase amount. Then, the target manager 208 compares the aggregate total purchase amount to the minimum threshold amount.

In step 704, if the target manager 208 determines that the minimum threshold amount has not been reached, processing proceeds to step 708 wherein the fuel discount processing is terminated. Return again to step 704, if the total purchase amount is greater than or equal to the minimum amount, processing proceeds to step 706. In step 706, the fuel discount is recorded for the associated customer account. That is, the target manager 208 records the awarded pre-defined fuel discount in the customer database 214 for the instant customer. Specifically, the newly earned fuel discount is stored in the customer's list of available fuel discounts. Thus, when the same customer wants to purchase fuel at a fuel center POS system 118 and presents his/her customer loyalty card, the fuel center POS system 118 retrieves the highest awarded discount from the customer's list of available fuel discounts stored in the customer's account and applies it to the customer's fuel purchase.

Once the target manager 208 records a newly earned fuel discount in a customer's record in the customer database 214, the target manager 208 also must update the customer's record to reflect the fact that the customer's purchases have been used to award the fuel discount. Thus, if a running total of the customer's purchases were used (such as over multiple transactions), then the running total must be decremented by the amount needed to award the fuel discount. This ensures that a customer's purchases are only used once in calculating a fuel discount.

Also, if a customer's total purchases are such that multiple fuel discounts can be awarded, the target manager 208 makes an entry in the customer's list of available fuel discounts for each occurrence of an earned fuel discount. For example, if the fuel discount is such that a customer earns a $0.10 per gallon fuel discount for each $100 spent, and the customer spends $220, then the target manager 208 makes two entries in the customer's list of available fuel discounts, each for a $0.10 fuel discount, as well as, decrements the customer's total purchases by $200.

Figure 8:
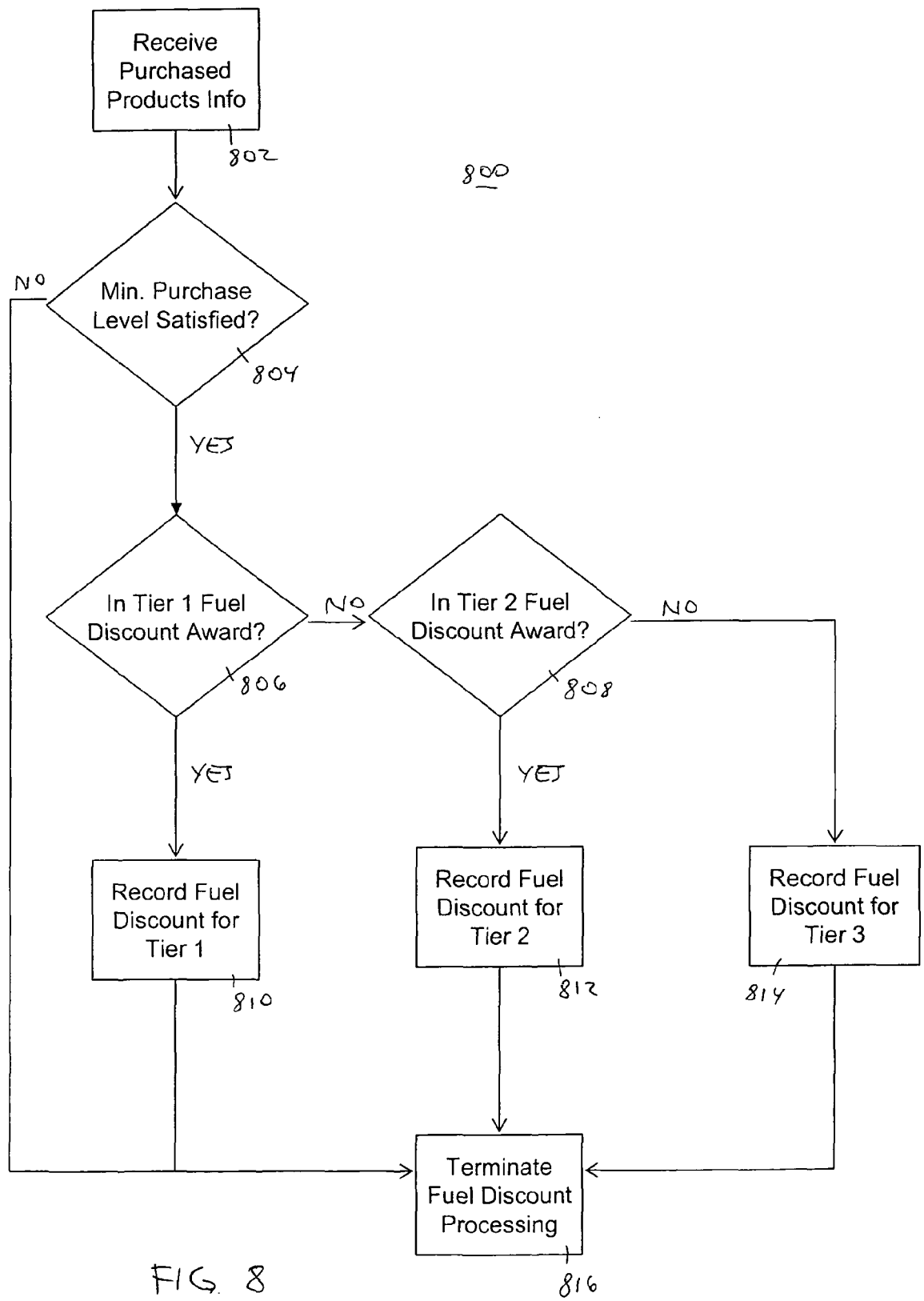
FIG. 8 is an operational flow diagram showing the calculation of a second type of fuel discount.

FIG. 8 is an operational flow diagram showing the calculation of a second type of fuel discount. In this embodiment, a customer receives a tiered discount program such that there are multiple threshold levels (or tiers) of spending, with each spending tier earning a different level of fuel discount. Thus, the tiered fuel discount system is achieved based on pre-defined thresholds wherein the more a customer spends, the higher the fuel discount he/she receives. In the preferred embodiment of an example of a tiered fuel discount system, there are three tiers for spending. Tier 1 is when a customer spends a minimum of $30.00 in total, then he/she receives a tier 1 fuel discount of $0.03 per gallon. Tier 2 is when a customer spends between $30.01 and a maximum threshold amount of $40.00, in which case he/she receives a $0.04 per gallon tier 2 fuel discount. Tier 3 is when a customer spends between $40.01 and a maximum threshold of $50.00, such that he/she receives a $0.05 per gallon tier 3 fuel discount. The present tiered fuel discount is described in terms of three tiers for convenience purposes only. It would be readily apparent to implement a comparable tiered fuel discount system having a different number of spending tiers with each tier having different threshold levels and different assigned fuel discounts.

Processing begins in step 802 wherein the target manager 208 receives the purchased products information. Processing continues to step 804 wherein the total purchased amount is compared to a minimum threshold amount for tier 1. If the target manager 208 determines that the minimum threshold amount has not been reached by the customer spending, processing continues to step 816 wherein the fuel discount processing is terminated. Returning to step 804, if the target manager 208 determines that the threshold minimum amount has been reached, processing proceeds to step 806. Also, as discussed above, the determination of whether the customer has spent the minimum threshold level is calculated using either the customer's current transaction alone or an aggregate of all transactions by the customer.

In step 806, the target manager 208 determines whether the customer's purchase amount falls within the first tier of the fuel discount rewards system. That is, if the total purchase amount is less than or equal to the tier 1 maximum threshold amount, then processing continues to step 810. In step 810, the target manager 208 records the fuel discount for tier 1 spending, such as $0.03 per gallon, in the customer's record in the customer database 214 with the customer's other earned fuel discounts. The target manager 208 then updates the customer's record to reflect the use of the customer's purchased amount in awarding the tier 1 fuel discount. The target manager 208 continues to step 816 wherein processing is terminated.

Returning to step 806, if the target manager 208 determines that the customer has spent greater than the tier 1 maximum threshold amount, processing continues to step 808. In step 808, the target manager 208 determines whether the customer has spent an amount that falls within the second tier of the fuel discount reward system. Specifically, if the total purchased amount is less than or equal to the tier 2 maximum threshold amount, then processing continues to step 812. In step 812, the target manager 208 records the awarded fuel discount for tier 2 spending, such as $0.04 per gallon, in the customer's record in the customer database 214 in the list of the customer's other earned fuel discounts. The target manager 208 then updates the customer's record to reflect the use of the customer's purchased amount in awarding the tier 2 fuel discount. The target manager 208 continues to step 816 wherein processing is terminated.

Returning to step 808, if the target manager 208 determines that the customer has spent more than the tier 2 maximum threshold amount, then processing continues to step 814. This is when the customer has spent the equivalent of the tier 3 reward. The target manager 208 records the fuel discount associated with the tier 3 reward, such as $0.05 per gallon, in the customer's record in the customer database 214 in the list of the customer's other earned fuel discounts. The target manager 208 then updates the customer's record to reflect the use of the customer's purchased amount in awarding the tier 3 fuel discount. The target manager 208 continues to step 816 wherein processing is terminated.

Figure 9:
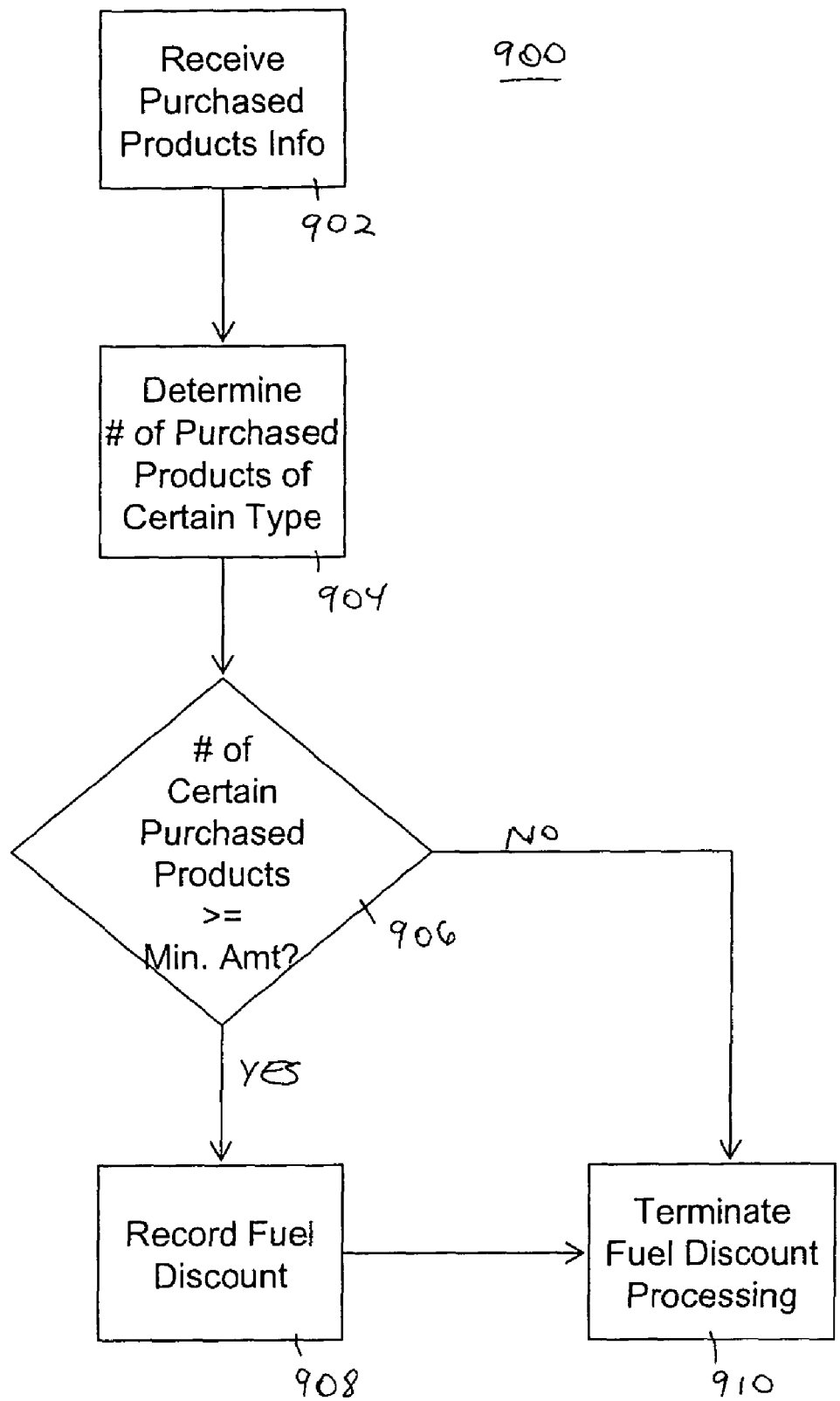
FIG. 9 is an operational flow diagram showing the calculation of a third type of fuel discount.

FIG. 9 is a operational flow diagram showing the calculation of a third type of fuel discount. This fuel discount is based on the number of purchased products of a certain type. For example, if a customer buys ten cereal products, such as ten boxes of cereal, the customer receives a $0.02 per gallon discount. Thus, the customer qualifies for the fuel discount based on the number of units of a specific product or product type purchased, not on the number of dollars spent in the store.

Processing of this embodiment of a fuel discount starts at step 902 wherein the target manager 208 receives the purchased product information. Processing continues to step 904. In step 904, the target manager 208 determines the number of products that the customer purchased which are of a certain type. For example, the target manager 208 determines how many boxes of a particular pasta brand or how many packages of steak were purchased in the instant transaction. In the preferred embodiment, the target manager 208 looks only at the instant transaction when determining whether the customer earned a fuel discount in step 904, but this is for convenience. Alternatively, the target manager 208 may review multiple transactions to determine if the customer purchased the minimum number of products or types of products to earn the fuel discount.

Continuing to step 906, the target manager 208 determines whether that number of the certain purchased products is greater than or equal to a minimum threshold amount, such as 2 packages of steak. If the minimum threshold has not been satisfied, processing continues to step 910, wherein the target manager 208 terminates the fuel discount processing.

Returning to step 906, if the target manager 208 determines that the number of certain purchased products does satisfy the minimum threshold, processing continues to step 908. In step 908, the awarded fuel discount is recorded in the customer database 214 for the instant customer in the list of the customer's available earned fuel discounts. Processing then continues to step 910, wherein the target manager 208 terminates the fuel discount processing.

Figure 10:
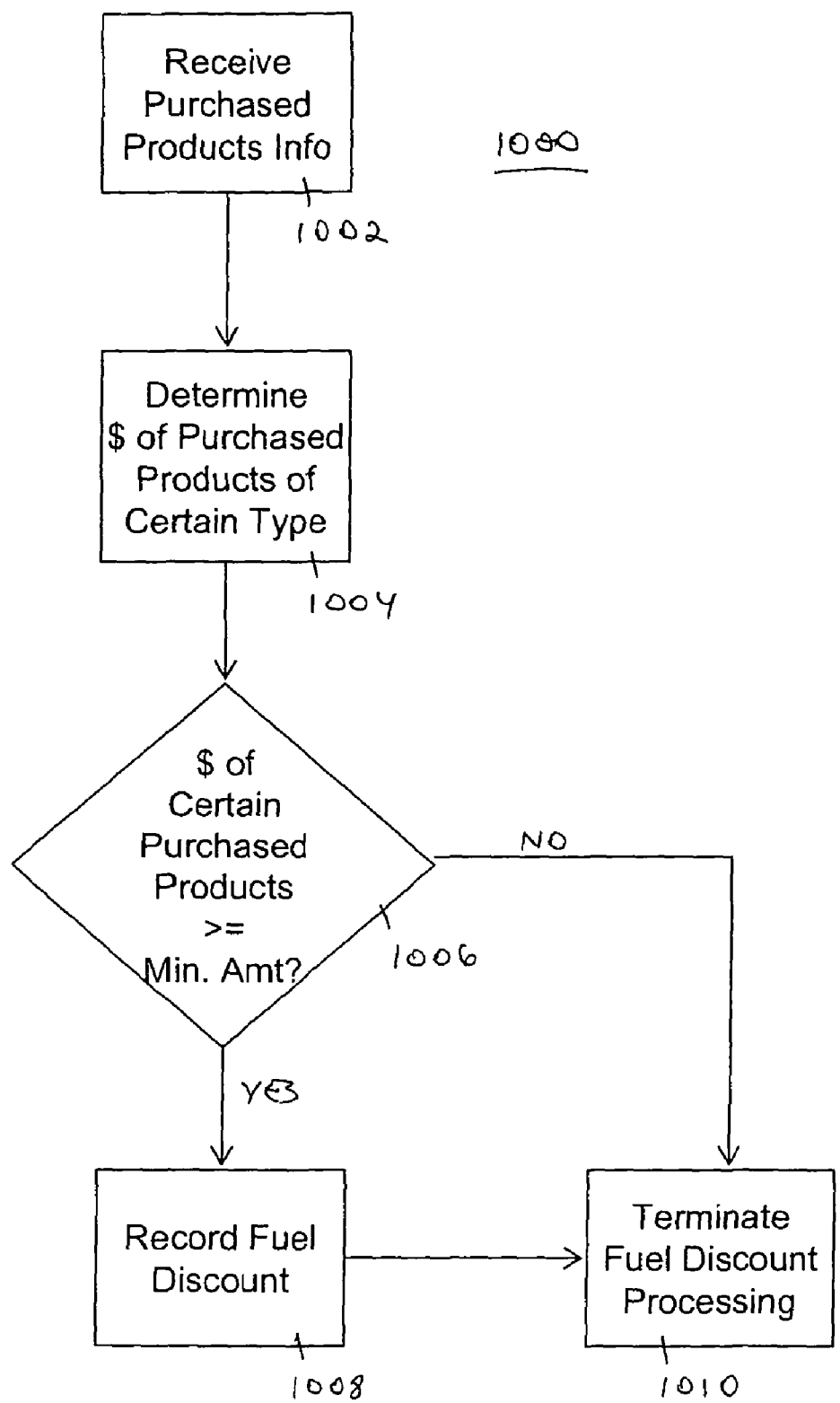
FIG. 10 is an operational flow diagram showing the calculation of a fourth type of fuel discount.

FIG. 10 is an operational flow diagram showing the calculation of a fourth type of fuel discount. In this type of discount, the fuel discount reward is based on the dollars spent on a certain type of purchased product. For example, if a customer buys $10.00 of General Mills cereal or $10.00 in the meat department, the customer receives a $0.02 per gallon fuel discount. Thus, the customer qualifies by spending in selected product categories such as in a particular department (meat, dairy, etc) or sub-category of goods. The qualification may also be based on a manufacturer code or a particular brand.

Processing begins at step 1002, wherein the target manager 208 receives the purchased product information. The target manager 208 continues immediately to step 1004. In step 1004, the target manager 208 determines the amount of money purchased on a pre-defined certain type of product. In the preferred embodiment, the target manager 208 looks only at the instant transaction when determining whether the customer earned a fuel discount in step 1004, but this is for convenience. Alternatively, the target manager 208 may review multiple transactions to determine if the customer spent the minimum amount on a specific product or type of product to earn the fuel discount.

Proceeding to step 1006, the target manager 208 determines whether the amount that the customer spent on the certain purchased products is greater than or equal to a minimum threshold amount. If the minimum threshold amount has not been satisfied, processing continues to step 1010, wherein the target manager 208 terminates the fuel discount processing. Returning to step 1006, if the customer has met the minimum threshold spending on certain purchased products, then processing continues to step 1008. In step 1008, the target manager 208 records the awarded fuel discount associated with that spending in the customer database 212 in the customer's list of available fuel discounts. Once the fuel discount is recorded, processing continues to step 1010 whereby the fuel discount processing is terminated.

Figure 11:
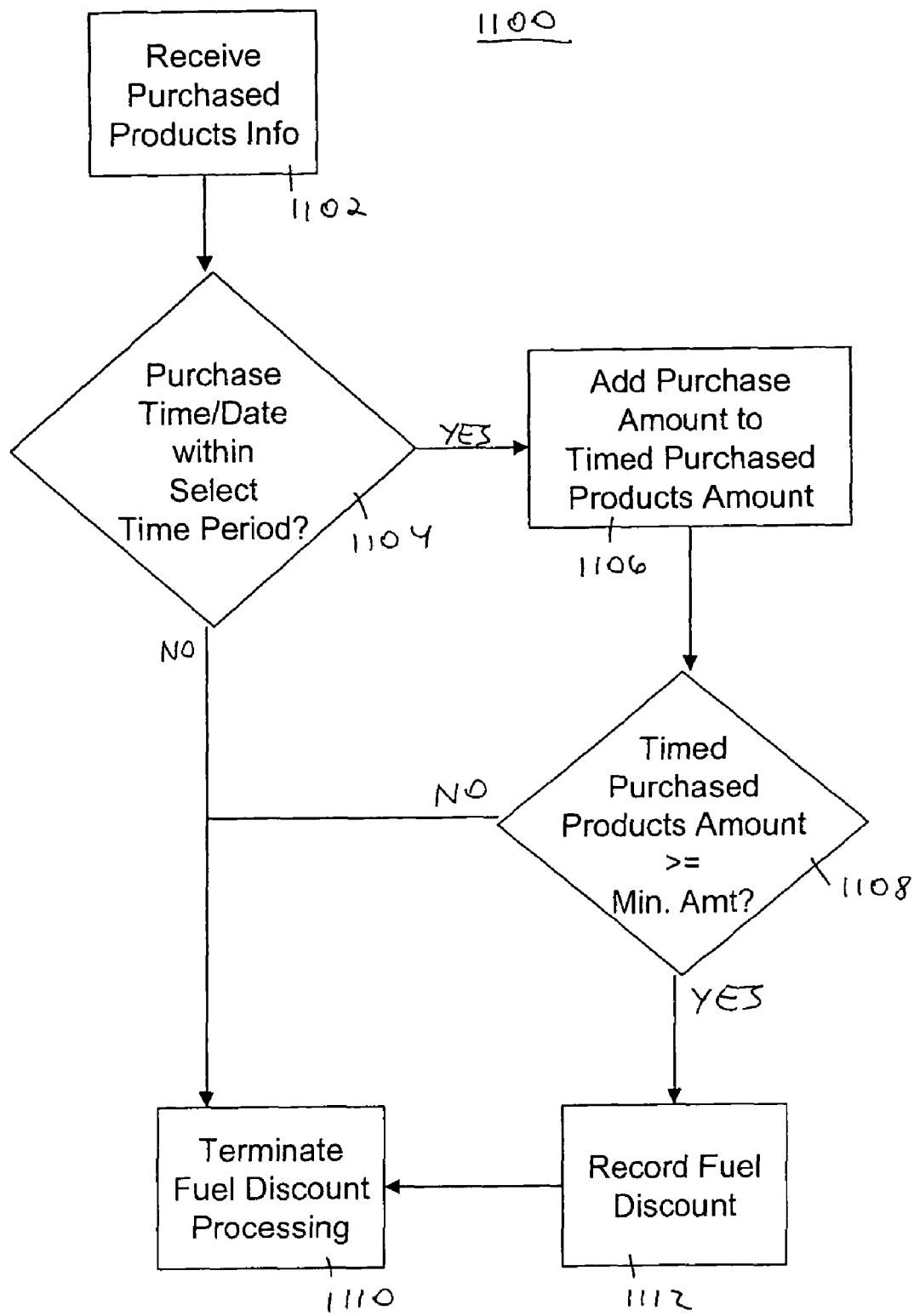
FIG. 11 is an operational flow diagram showing the calculation of a fifth type of fuel discount.

FIG. 11 is an operational flow diagram showing the calculation of a fifth type of fuel discount, whereby if a customer spends a total amount within a specified time period, then the customer gets the associated fuel discount. Processing begins at step 1102 whereby the target manager 208 receives the purchased product information. The target manager 208 continues immediately to step 1104. In step 1104, the target manager 208 determines whether the instant purchase was made within the select time period for awarding the fuel discount. If the customer made the instant purchase of the products outside of the select time period, processing continues immediately to step 1110, whereby the fuel discount processing is terminated.

Returning to step 1104, if the customer's purchase is within the select time period for awarding the fuel discount, processing continues to step 1106. In step 1106, the target manager 208 adds the instant purchase amount to the timed purchased product amount. The timed purchased product amount is preferably a variable stored in the customer's account record in the customer database 214. This allows the customer's purchases to accumulate over time so long as each such purchase is made within the select time period. After the customer's new purchases are added to the timed purchased product amount, processing continues to step 1108, wherein the target manager 208 determines whether the accumulated time purchased products is greater than or equal to the minimum threshold amount. If the minimum threshold amount is not satisfied, then processing continues to step 1110, whereby once again, the fuel discount processing is terminated.

Returning back to step 1108, if the target manager 208 determines that the timed purchased product amount does meet the minimum threshold amount, then processing continues to step 1112. In step 1112, the target manager 208 records the awarded fuel discount in the customer's record in the customer database 214 in the list of the customer's available fuel discounts. The target manager 208 also updates the customer's record by decrementing the timed purchased products amount by that amount needed to award the fuel discount. This ensures that the customer only benefits once from his/her purchases. After recording the discount, processing continues to step 1110, whereby the fuel discount processing is terminated.

Figure 12:
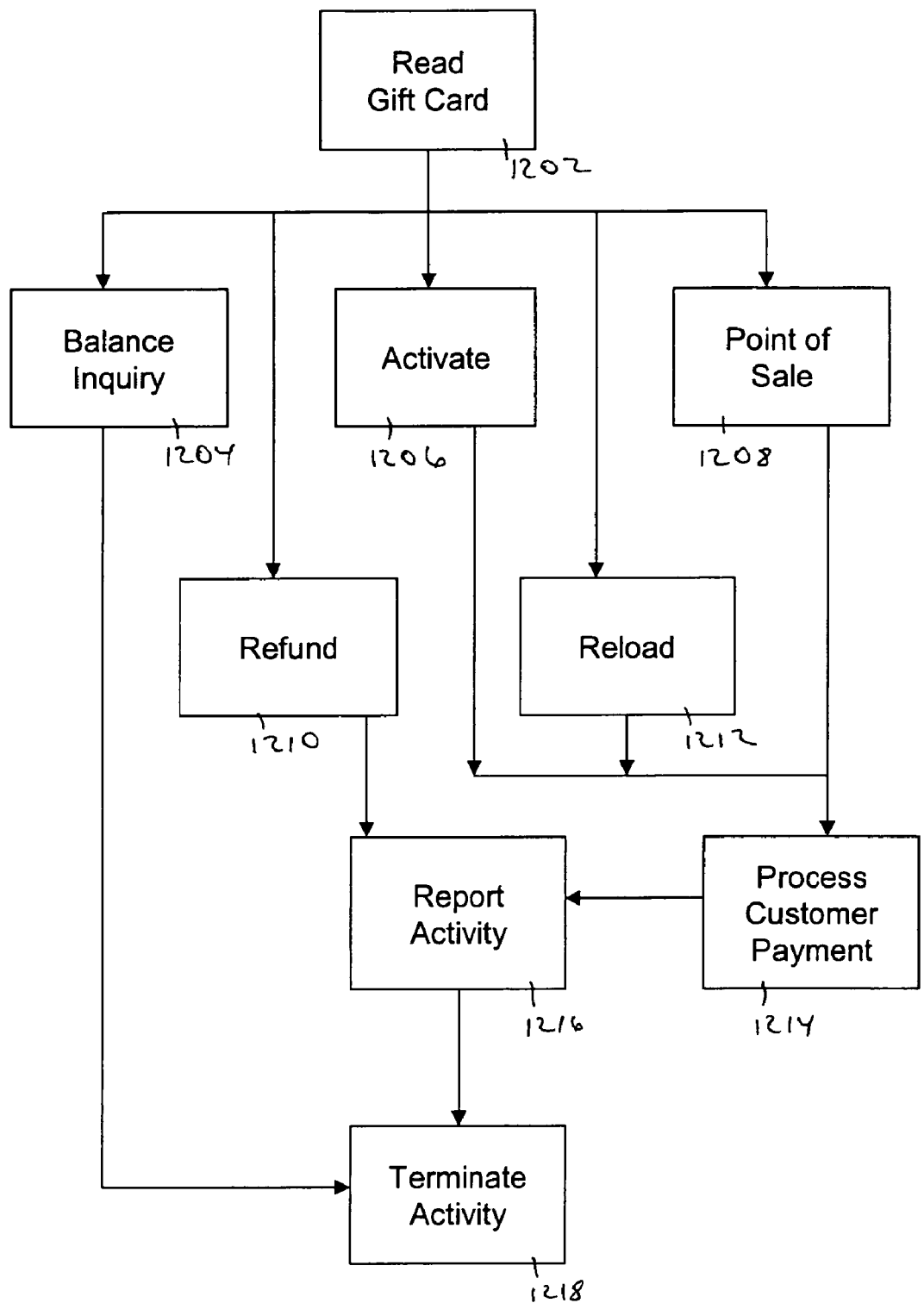
FIG. 12 is an operational flow diagram showing a fuel center of the fuel center system processing a gift card.
Figure 13:
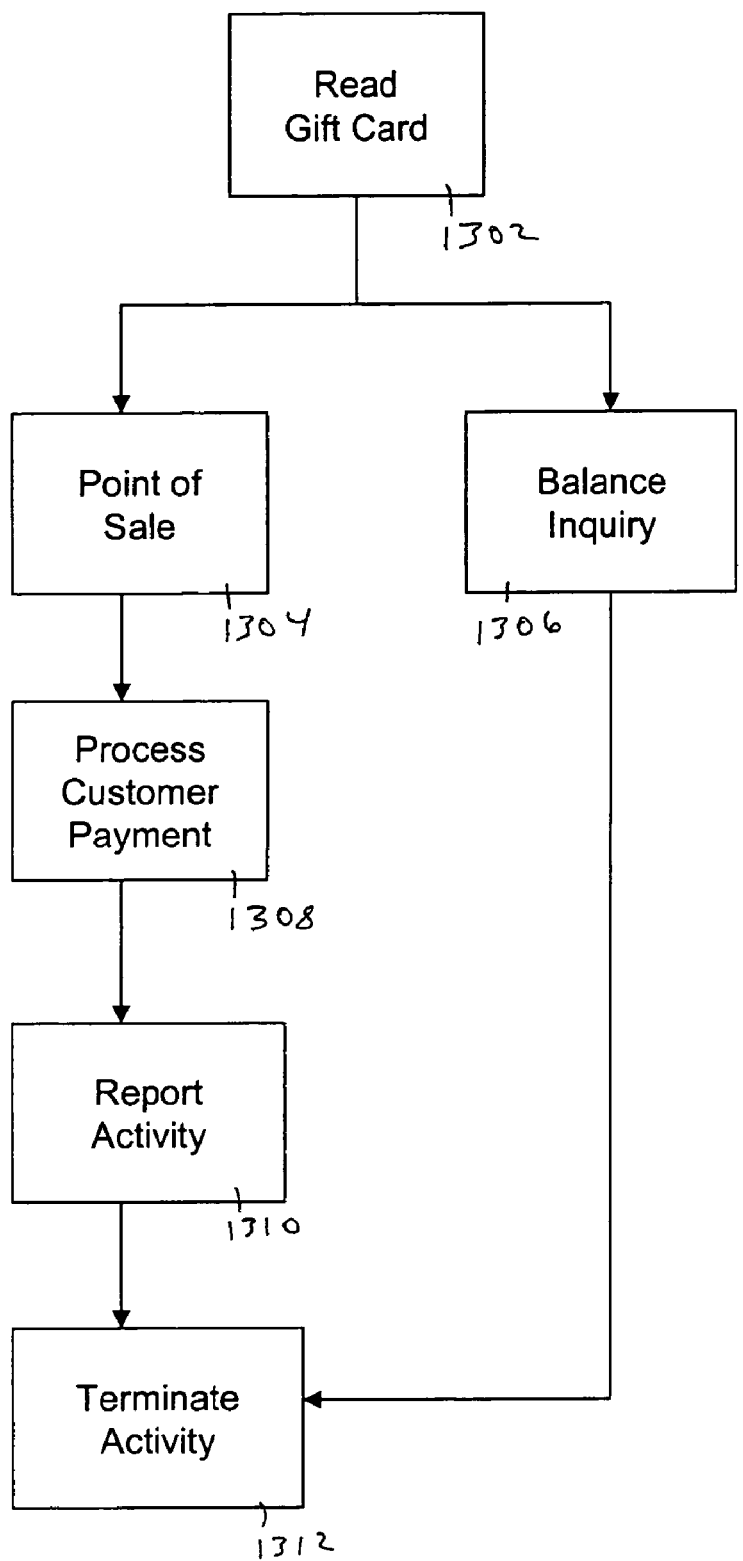
FIG. 13 is an operational flow diagram showing a pump of the fuel center system processing a gift card.

FIGS. 12 and 13 provide operational flow diagrams for managing a gift card for the purchase of fuel at a fuel center POS system 118. The gift card processing is handled between the fuel center sales manager 224 and the gift card payment handler 230. In particular, FIG. 12 is an operational flow diagram showing a fuel center 110 which is presented with a gift card by a customer. Upon being presented with a gift card in step 1202, the fuel center sales manager 224 performs one of five functions. Specifically, fuel center sales manager 224 responds to a balance inquiry 1204, reload operation 1212, activate card 1206, refund operation 1210, or making a purchase of products or fuel (a point-of-sale) 1208.

Returning to step 1202, the fuel center sales manager 224 reads a gift card presented by the customer. If the gift card has not been activated already, the fuel center sales manager 224 proceeds to step 1206 where it prompts the customer to activate the gift card with a specific amount. After the customer providing the amount he/she desires to put on the gift card, processing continues to step 1214 wherein the fuel center sales manager 224 processes the customer payment. Similar to step 310, the fuel center sales manager 224 processes payment by cash, check, or credit or bank card. After processing the customer's payment, the fuel center sales manager 224 proceeds to step 1216. In step 1216, the fuel center sales manager 224 communicates with the gift card payment handler 230 and informs the gift card payment handler 230 about the activation of the new card. In particular, the fuel center sales manager 224 provides the gift card account number and the gift amount. The gift card payment handler 230 records the activation of the gift card in the gift card database 232 for the specified amount. Processing continues to step 1218 and the gift card activity is terminated.

Returning to step 1202, if the customer informs the cashier at the fuel center 110 that he/she wants to inquire as to the balance on a gift card, processing continues to step 1204. In step 1204, the fuel center sales manager 224 communicate with the gift card payment handler 230 and retrieves the balance on the card for the provided gift card account. The gift card payment handler 230 accesses the gift card database 232, retrieves the current balance on the presented gift card, and sends that amount back to the fuel center sales manager 224, which in turn informs the customer of the balance. Once the inquiry has been satisfied, processing continues to step 1218, wherein the gift card activity is terminated.

Returning to step 1202, if the customer informs the cashier at the fuel center 110 that he/she wants to reload or put additional funds on the gift card, processing continues to step 1212. In step 1212, the fuel center sales manager 224 prompts the customer for the amount of additional funds to put on the gift card. After the customer provides the amount he/she desires to put on the gift card, processing continues to step 1214 wherein the fuel center sales manager 224 processes the customer payment. Similar to step 310, the fuel center sales processes payment by cash, check, or credit or bank card. After processing the customer's payment, the fuel center sales manager 224 proceeds to step 1216. In step 1216, the fuel center sales manager 224 communicates with the gift card payment handler 230 and informs the gift card payment handler 230 about the additional funds loaded onto the present gift card. In particular, the fuel center sales manager 224 provides the gift card account number and the reload amount. The gift card payment handler 230 records the reload amount for the gift card in the gift card database 232 by adding the reload amount to the previous balance on the given gift card. Processing continues to step 1218 and the gift card activity is terminated.

Returning to step 1202, once the gift card is read and the customer informs the cashier at the fuel center 110 that he/she wants a refund, such as a refund for returning specific items purchased previously at the fuel center 110, and that the refund is to be placed on the gift card, then processing continues to step 1210. In step 1210, the fuel center sales manager 224 processes the refund by conventional means. When the refund amount is calculated then processing continues to step 1216 wherein the fuel center sales manager 224 reports the gift card activity. That is, the fuel center sales manager 224 communicates the amount of the refund to be added to the current gift card balance to the gift card payment handler 230. Upon receipt of gift card account and the refund amount, the gift card payment handler 230 accesses the gift card database 232 and increases the amount on the corresponding gift card for the current customer by the amount of the refund. Once the refund has been completed, then processing continues to step 1218 where the gift card activity is terminated.

Returning to step 1202, if a customer is purchasing products and/or fuel at the fuel center 110 and presents the gift card to be used as payment, then processing continues to step 1208. In step 1208, the fuel center sales manager 224 uses conventional methods to calculate the total sum owed by the customer for the purchased products and/or fuel. See FIG. 5. Once the total amount due is calculated, then the fuel sales manager 224 communicates with the gift card payment handler 230 to determine how much funds are available on the gift card for payment of the purchased products and/or fuel. The gift card payment handler 230 accesses the gift card database 232 to determine the balance on the present gift card and returns that amount to the fuel center sales manager 224. Upon receipt of the balance, the fuel center sales manager 224 calculates any outstanding amounts owed by the customer. That is, if the balance on the gift card is greater than or equal to the total sum owed, there is no outstanding balance due by the customer. If the balance on the gift card is less than the total sum owed, the outstanding balance is the difference between the total sum owed and the gift card balance. The fuel center sales manager 224 proceeds to step 1214 wherein it prompts the customer to pay the outstanding balance, if any, and processes the customer's payment as described above. Processing continues to step 1216. In step 1216, the fuel center sales manager 224 communicates with the gift card payment handler 230 and informs the gift card payment handler 230 about the use of the current gift card. In particular, the fuel center sales manager 224 provides the gift card account number and the amount used in the current transaction. The gift card payment handler 230 records use of the gift card funds by decrementing the current balance by the amount used in the purchase of products and/or fuel. The updated balance is then stored in the gift card database 232. Once the use of the gift card is recorded, processing continues to step 1218 wherein the gift card activity is terminated.

FIG. 13 is an operational flow diagram showing a pump 114 at a fuel center POS system 118 wherein a customer presents a gift card to purchase fuel at the pump 114. Processing starts at step 1302 wherein a conventional card reader at the pump 114 reads the gift card. Once the gift card is read by the pump handler 228 at the pump 114, the customer has two options: to purchase fuel, such as in step 1304, or to inquire as to the balance on the gift card as in step 1306.

Returning to step 1302, if a customer wants to purchase fuel, processing continues to step 1304. In step 1304, the pump handler 228 calculates the amount owed for the desired amount of fuel being purchased in the same manner as described above with respect to FIG. 4. Once the total sale price is calculated and the customer presents the gift card to be used as payment, the pump handler 228 communicates with the gift card payment handler 230 via the fuel center sales manager 224 to determine how much funds are available on the gift card for payment of the purchased fuel. The gift card payment handler 230 accesses the gift card database 232 to determine the balance on the present gift card and returns that amount to the fuel center sales manager 224 which in turn forwards the gift card balance to the pump handler 228. Upon receipt of the balance, the pump handler 228 calculates any outstanding amounts owed by the customer. That is, if the balance on the gift card is greater than or equal to the total sum owed for the fuel, there is no outstanding balance due by the customer. If the balance on the gift card is less than the total sum owed, the outstanding balance is the difference between the total sum owed and the gift card balance. The pump handler 228 proceeds to step 1308 wherein it prompts the customer to pay the outstanding balance, if any, and processes the customer's payment as described above in step 310 on FIG. 4. Processing continues to step 1310.

In step 1310, the pump handler 228 communicates with the gift card payment handler 230 through the fuel center sales manager 224 and informs the gift card payment handler 230 about the use of the current gift card. In particular, the pump handler 228 provides the gift card account number and the amount used in the current transaction for purchasing fuel. The gift card payment handler 230 records use of the gift card funds by decrementing the current balance by the amount used in the purchase of products and/or fuel. The updated balance is then stored in the gift card database 232. Once the use of the gift card is recorded, processing continues to step 1312 wherein the gift card activity at the pump 114 is terminated.

Returning to step 1302, if the customer at the pump 114 selects a balance inquiry option such that he/she wants to inquire as to the balance on the gift card, processing continues to step 1306. In step 1306, the pump handler 228 communicate with the gift card payment handler 230 through the fuel center sales manager 224 and retrieves the balance on the card for the provided gift card account. The gift card payment handler 230 accesses the gift card database 232, retrieves the current balance on the presented gift card, and sends that amount back to the fuel center sales manager 222, which in turn forwards the current balance to the pump handler 228 which informs the customer at the pump 114 on the balance. Once the inquiry has been satisfied, processing continues to step 1312, wherein the gift card activity is terminated.

Alternatively, the fuel center sales manager 224 handles all of the processing of a gift card for the pump handler 228. In this embodiment, the fuel center sales manager 224 communicates with the pump handler 228 regarding account information for the customer's loyalty card, gift card, and credit or debit card (if needed for an outstanding balance). Thus, the fuel center sales manager 224 simply returns an image of a receipt to the pump handler 228 for printing.

CONCLUSION

While various embodiments of the present invention have been described above, it should be understood that they have been presented by the way of example only, and not limitation. It will be understood by those skilled in the art that various changes in form and details may be made therein without departing from the spirit and scope of the invention as defined. Thus, the breadth and scope of the present invention should not be limited by any of the above-described exemplary embodiments.

What is claimed is:

1. A method for generating a fuel discount, comprising the steps of:
   (a) receiving customer identifying information at a fuel pump;
   (b) based upon the customer, determining multiple possible fuel discounts available to the customer;
   (c) prior to communicating discount level information to the customer at the pump, selecting a highest fuel discount available from the multiple possible fuel discounts;
   (d) applying the selected highest fuel discount to the customer at the pump.

2. The method of claim 1 wherein, each of the multiple possible fuel discounts is dependent upon a dollar value of prior purchases by the customer in a grocery store during a pre-defined time period.

3. The method of claim 2 wherein each of the multiple possible fuel discounts has an associated required predefined spending threshold for the pre-defined time period.

4. The method of claim 3 including the step of prior to steps (a), (b), (c) and (d), tracking the dollar value of the customer's purchases over multiple transactions in the grocery store during the pre-defined time period.

5. The method of claim 4 including the further step of, subsequent to steps (a), (b), (c) and (d), updating a customer's records to reflect customer purchases were used to award the selected highest fuel discount.

6. A method for providing a fuel discount, comprising the steps of:
   (a) receiving customer identifying information at a fuel pump;
   (b) determining first and second fuel discounts available to the customer, the first fuel discount based upon purchases made during one time period and the second fuel discount based upon purchases made during another time period;
   (c) identifying which of the first and second fuel discounts is a higher discount;
   (d) reducing price-per-gallon at the pump by an amount corresponding to the identification made in step (c).

* * * * *